(12) United States Patent
Schmalen

(10) Patent No.: US 10,834,485 B2
(45) Date of Patent: Nov. 10, 2020

(54) GEOMETRIC CONSTELLATION SHAPING FOR OPTICAL DATA TRANSPORT

(71) Applicant: Nokia Solutions and Networks Oy, Espoo (FI)

(72) Inventor: Laurent Schmalen, Stuttgart (DE)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 16/595,031

(22) Filed: Oct. 7, 2019

(65) Prior Publication Data
US 2020/0112777 A1   Apr. 9, 2020

(30) Foreign Application Priority Data

Oct. 8, 2018  (EP) .................................... 18199135

(51) Int. Cl.
*H04Q 11/00* (2006.01)
*H04B 10/532* (2013.01)
*H04B 10/61* (2013.01)

(52) U.S. Cl.
CPC ....... *H04Q 11/0067* (2013.01); *H04B 10/532* (2013.01); *H04B 10/61* (2013.01); *H04Q 11/0071* (2013.01); *H04Q 2011/0088* (2013.01); *H04Q 2213/1301* (2013.01); *H04Q 2213/13038* (2013.01); *H04Q 2213/13343* (2013.01)

(58) Field of Classification Search
None
See application file for complete search history.

(56) References Cited

U.S. PATENT DOCUMENTS

| | | | |
|---|---|---|---|
| 7,512,573 B2 | 3/2009 | Martinez | |
| 10,027,423 B1* | 7/2018 | Morero | ................ H04L 25/067 |
| 2015/0324685 A1* | 11/2015 | Bohn | ....................... G06N 3/04 |
| | | | 706/15 |
| 2017/0244489 A1* | 8/2017 | Zhuge | .................... H04B 10/40 |

FOREIGN PATENT DOCUMENTS

| | | |
|---|---|---|
| WO | 2018193018 A1 | 10/2018 |
| WO | 2018233932 A1 | 12/2018 |
| WO | 2018234084 A1 | 12/2018 |
| WO | 2019080987 A1 | 5/2019 |

(Continued)

OTHER PUBLICATIONS

Jones et al., "Geometric Constellation Shaping for Fiber Optic Communication Systems via End-to-end Learning", Oct. 1, 2018, arXiv:1810.00774v1 [cs.IT] , pp. 1-9 (Year: 2018).*

(Continued)

*Primary Examiner* — David W Lambert
(74) *Attorney, Agent, or Firm* — Mendelsohn Dunleavy, P.C.; Yuri Gruzdkov

(57) ABSTRACT

An apparatus includes an optical transmitter and/or an optical receiver configured to use one or more artificial neural networks (ANNs) for geometric constellation shaping, the determination of constellation symbols to be transmitted, and/or the determination of the transmitted bit-word(s) or codewords. Each ANN has a plurality of bit-level processing portions connected to a symbol-level processing portion in a manner that enables bitwise processing of constellation-point labels.

24 Claims, 12 Drawing Sheets

(56) References Cited

FOREIGN PATENT DOCUMENTS

WO   2019080988 A1   5/2019

OTHER PUBLICATIONS

Eriksson et al., "Applying Neural Networks in Optical Communication Systems: Possible Pitfalls", IEEE Photonics Technology Letters, vol. 29, No. 23, Dec. 1, 2017, pp. 2091-2094.
O'Shea et al., "An Introduction to Deep Learning for the Physical Layer", Arxiv, Jul. 11, 2017, pp. 1-13.
Karanov et al., "End-to-End Deep Learning of Optical Fiber Communications", Arxiv, Aug. 3, 2018, pp. 1-13.
Li et al., "Achievable Information Rates for Nonlinear Fiber Communication via End-to-end Autoencoder Learning", Arxiv, Apr. 20, 2018, 3 pages.
He et al., "Deep Residual Learning for Image Recognition", Arxiv, Dec. 10, 2015, pp. 1-12.
Guresen et al., "Definition of Artificial Neural Networks with Comparison to Other Networks", Procedia Computer Science, vol. 3, 2011, pp. 426-433.
Extended European Search Report received for corresponding European Patent Application No. 18199135.7, dated Apr. 1, 2019, 11 pages.
Jones et al., "Geometric Constellation Shaping for Fiber Optic Communication Systems via End-to-end Learning", Arxiv, Oct. 1, 2018, pp. 1-9.

\* cited by examiner

500

530

800

1100

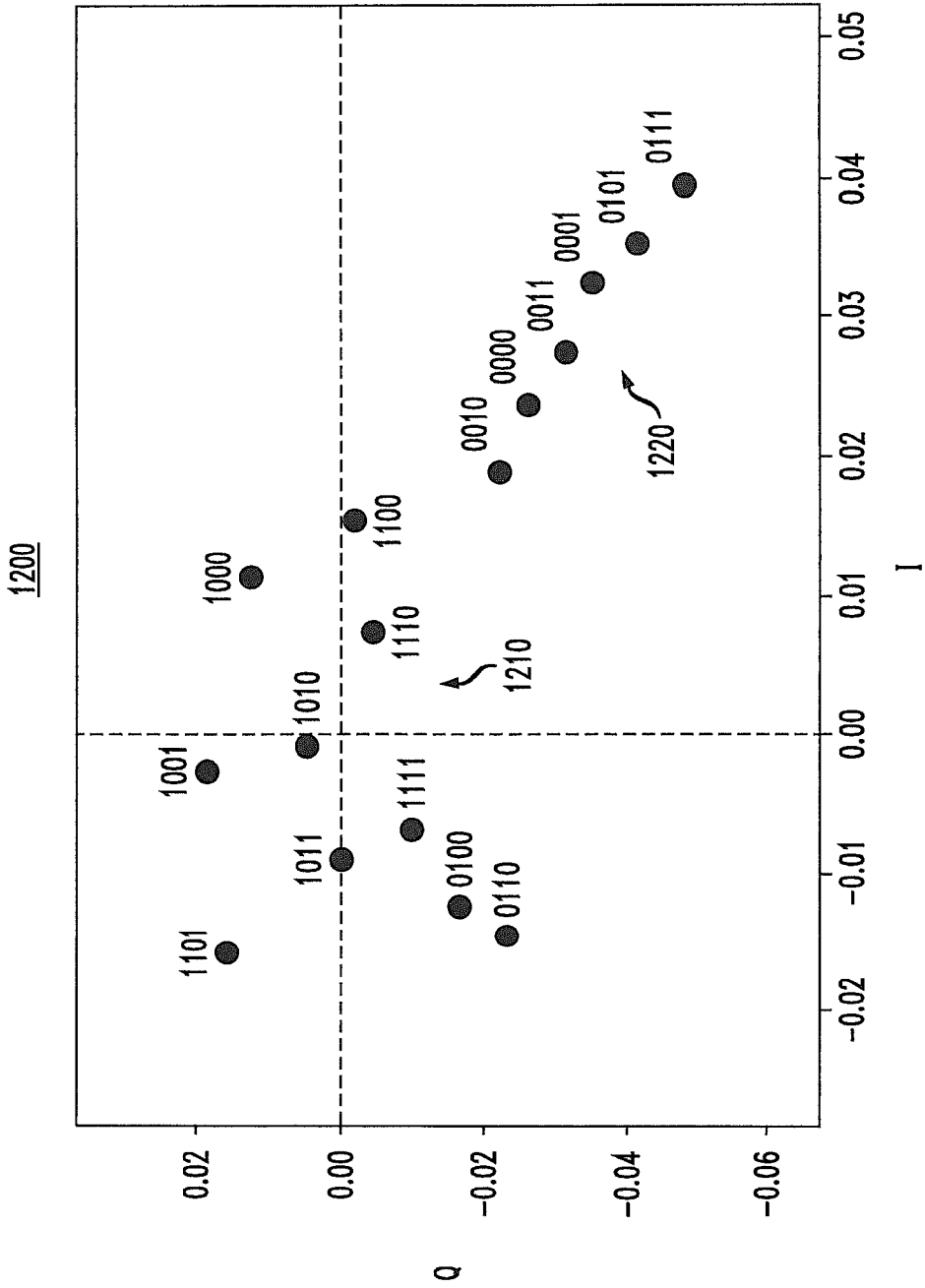

1310

1320

1330

1340

LEGEND:  ☐ BIT VALUE = 1   ■ BIT VALUE = 0

GEOMETRIC CONSTELLATION SHAPING FOR OPTICAL DATA TRANSPORT

This application claims priority to and the benefit of European Patent Application No. 18199135.7 filed Oct. 8, 2018, which is hereby incorporated herein by reference in its entirety.

BACKGROUND

Field

Various example embodiments relate to optical communication equipment and, more specifically but not exclusively, to methods and apparatus that can be used for geometric constellation shaping in an optical data-transport system.

Description of the Related Art

This section introduces aspects that may help facilitate a better understanding of the disclosure. Accordingly, the statements of this section are to be read in this light and are not to be understood as admissions about what is in the prior art or what is not in the prior art.

An artificial neural network (ANN) may implement an information-processing paradigm developed based on certain features of biological nerve systems, such as, for example, the brain. An example processing circuit, device, or system for such an information-processing paradigm may be constructed using a plurality of interconnected processing elements (PEs; also sometimes referred to as ANN nodes or artificial neurons) that are designed and configured to work together to solve a specific problem. In some ANNs, the number of such PEs may be relatively large. Because some such ANNs can learn by example, such ANNs can be trained for a specific application, such as pattern recognition, data classification, parameter-field optimization, etc. The corresponding learning process typically involves iterative adjustment of synaptic connections between different artificial neurons and/or decision making in the neuron core.

In some data-transport systems, the end-to-end (e.g., data source to data sink) signal transfer can be difficult to describe with tractable mathematical models. In such systems, conventional system designs, in which the chain of signal processing has multiple independent processing blocks, each executing a well-defined and isolated function (e.g., coding, modulation, equalization, etc.), may lead to suboptimal and/or unsatisfactory performance. For this reason, ANN-based data-transport system designs are being considered as an alternative.

SUMMARY OF SOME SPECIFIC EMBODIMENTS

Disclosed herein are various embodiments of an optical data-transport system configured to use one or more artificial neural networks (ANNs) for geometric constellation shaping, the determination of constellation symbols to be transmitted, and/or the determination of the transmitted bit-word(s) or codewords. In some embodiments, such geometric constellation shaping may be directed at finding a constellation that can provide a desired performance for the given optical channel between the transmitter and receiver thereof. In an example embodiment, an ANN used therein has a plurality of bit-level processing portions connected to a symbol-level processing portion in a manner that enables bitwise processing (e.g., assignment or recovery) of constellation-point labels. Adjustment of the ANN's configuration parameters during a training mode of operation can be used to find a better geometric arrangement of the constellation points and/or better labeling of the constellation points that can then be used during a payload mode of operation.

In some embodiments, the ANN configuration parameters can be used to enable a bypass of the ANNs during the payload mode of operation. For example, a look-up table can be loaded with constellation data derived from the ANN configuration parameters and used to replicate the output of the transmitter ANN. A demapping circuit can be loaded with decision maps derived from the ANN configuration parameters and used to replicate the output of the receiver ANN.

Various embodiments can advantageously be used, e.g., to handle optical data transport for optical channels that cannot be satisfactorily handled by conventional signal-processing chains employing multiple independent processing blocks, each executing a well-defined and isolated function.

According to one embodiment, provided is an apparatus comprising: an optical data transmitter that includes: an optical modulator, one or more electrical drivers connected to operate the optical modulator to modulate an optical carrier to carry a stream of digital symbols, and a digital signal processor connected to control the one or more electrical drivers in response to input data; and wherein the digital signal processor is configured to use an artificial neural network to determine values of the digital symbols corresponding to values of input bit-words applied to a plurality of inputs of the artificial neural network, each of the inputs being configured to carry a respective bit of the input bit-words to a different respective portion of the artificial neural network, each of the portions being configured to respond to a respective one of the inputs.

According to another embodiment, provided is an apparatus comprising: a coherent optical data receiver that includes an optical-to-electrical converter for a modulated optical carrier, a plurality of analog-to-digital converters, and a digital signal processor, the analog-to-digital converters being configured to output a stream of digitalizations of measurements of the modulated optical carrier performed by the optical-to-electrical converter; and wherein the digital signal processor is electrically connected to process the stream of digitalizations using an artificial neural network configured to generate a stream of output bit-words on a plurality of outputs in response to the stream of digitalizations, each of the outputs being configured to carry a respective bit of the output bit-words generated by a different respective portion of the artificial neural network, each of the different respective portions being connected to control a respective one of the outputs.

BRIEF DESCRIPTION OF THE DRAWINGS

Other aspects, features, and benefits of various disclosed embodiments will become more fully apparent, by way of example, from the following detailed description and the accompanying drawings, in which:

FIG. 12 graphically shows an example constellation that can be generated using the communication method of FIG. 10 according to an embodiment.

DETAILED DESCRIPTION

Some embodiments may benefit from some features disclosed in the following international patent applications: PCT/EP2018/065422, PCT/EP2018/062479, PCT/EP2018/059994, PCT/EP2017/076964, and PCT/EP2017/076965. All these international patent applications are incorporated herein by reference in their entirety.

Figure 1:
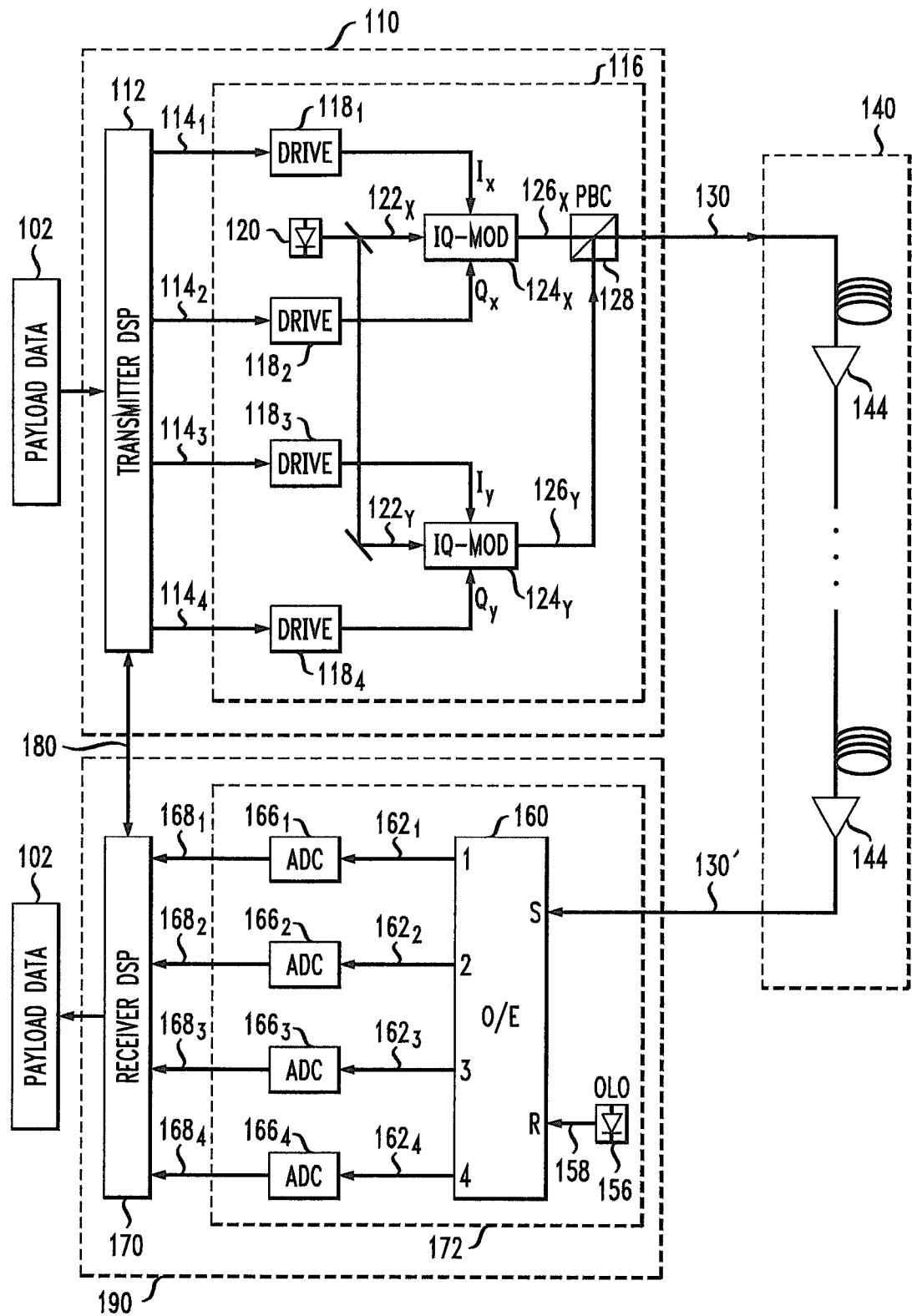
FIG. 1 shows a block diagram of an optical communication system according to an embodiment.

FIG. 1 shows a block diagram of a coherent optical communication system 100 according to an embodiment. System 100 has an optical transmitter 110 and a coherent optical receiver 190 coupled to one another via an optical communication link 140. Transmitter 110 and receiver 190 may also be connected to one another by way of a control link 180, which can be used, e.g., by the receiver and/or transmitter to send service messages and/or control signals. In an example embodiment, control link 180 can be implemented using the control plane of system 100 and/or over an Internet connection. Control link 180 can be used, e.g., for ANN training purposes and/or to enable transmitter 110 and receiver 190 to operate in a collaborative manner.

In an example embodiment, system 100 can operate in a payload mode and a training mode.

In a training mode, system 100 uses pilot data sequences "known" to both transmitter 110 and receiver 190 to perform, inter alia, geometric constellation shaping, e.g., as described below in reference to FIGS. 10-13. In an example embodiment, such constellation shaping may include but is not limited to the steps of: (i) selecting and/or changing the size of the constellation; (ii) changing the position of one or more constellation points on the IQ plane; (iii) changing a respective binary label (e.g., bit-word) of one or more constellation points; and (iv) using a set of predetermined criteria to drive the changes made at steps (ii) and (iii). An example outcome upon the completion of a training-mode run can be a fixed constellation, wherein each constellation point has a respective fixed position on the IQ plane and a respective fixed binary label (e.g., a bit-word of selected length) assigned thereto (see, e.g., FIG. 12). The fixed binary label is the bit-word encoded by the constellation point. This fixed constellation can then be used for data transmission during a payload mode.

In a payload mode, transmitter 110 receives a digital electrical input stream 102 of payload data and applies it to a digital signal processor (DSP) 112. DSP 112 processes input data stream 102 to generate digital signals $114_1$-$114_4$. In an example embodiment, DSP 112 may perform, inter alia, one or more of the following: (i) de-multiplex input stream 102 into two sub-streams, each intended for optical transmission using a respective one of the orthogonal (e.g., X and Y) polarizations of an optical output signal 130; (ii) encode each of the sub-streams using a suitable forward-error-correction (FEC) code, e.g., to enable error correction at receiver 190; and (iii) convert each of the two resulting sub-streams into a corresponding sequence of constellation symbols of the fixed constellation determined during the training mode. In each signaling interval (also referred to as a symbol period or time slot), signals $114_1$ and $114_2$ carry digital values that represent the in-phase (I) component and quadrature (Q) component, respectively, of a corresponding constellation symbol intended for transmission using a first (e.g., X) polarization of light. Signals $114_3$ and $114_4$ similarly carry digital values that represent the I and Q components, respectively, of the corresponding constellation symbol intended for transmission using a second (e.g., Y) polarization of light.

An E/O converter 116 (also sometimes referred to as a front end or front-end circuit) of transmitter 110 operates to transform digital signals $114_1$-$114_4$ into a corresponding modulated optical output signal 130. More specifically, drive circuits $118_1$ and $118_2$ transform digital signals $114_1$ and $114_2$, as known in the art, into electrical analog drive signals $I_X$ and $Q_X$, respectively, for the corresponding signaling interval. Drive signals $I_X$ and $Q_X$ are then used, in a conventional manner, to drive an I-Q modulator $124_X$. In response to drive signals $I_X$ and $Q_X$, I-Q modulator $124_X$ operates to modulate an X-polarized beam $122_X$ of light supplied by a laser source 120 as indicated in FIG. 1, thereby generating a modulated optical signal $126_X$.

Drive circuits $118_3$ and $118_4$ similarly transform digital signals $114_3$ and $114_4$ into electrical analog drive signals $I_Y$ and $Q_Y$, respectively, for the corresponding signaling interval. In response to drive signals $I_Y$ and $Q_Y$, an I-Q modulator $124_Y$ operates to modulate a Y-polarized beam $122_Y$ of light supplied by laser source 120 as indicated in FIG. 1, thereby generating a modulated optical signal $126_Y$. A polarization beam combiner 128 operates to combine modulated optical signals $126_X$ and $126_Y$, thereby generating optical output signal 130. Optical output signal 130 is then applied to optical communication link 140.

In an example embodiment, a drive circuit 118 may include a digital-to-analog converter (DAC, not explicitly shown in FIG. 1).

Optical communication link 140 is illustratively shown as being an amplified optical link having a plurality of optical amplifiers 144 configured to amplify the optical signals that are being transported through the optical fiber(s) of the link, e.g., to counteract signal attenuation in the fiber spans thereof. Note that optical communication link 140 that has only one or even no optical amplifiers 144 can similarly be used in an alternative embodiment. After propagating through optical communication link 140, optical signal 130 becomes optical signal 130', which is applied to receiver 190. Optical signal 130' may differ from optical signal 130 because optical communication link 140 typically adds noise and imposes various signal distortions, e.g., due to optical amplifier(s) and/or due to chromatic dispersion, polarization rotation, polarization-mode dispersion, and/or nonlinear optical effects, e.g., in optical fiber(s).

Receiver 190 has a front-end circuit 172 comprising an optical-to-electrical (O/E) converter 160, analog-to-digital converters (ADCs) 166₁-166₄, and an optical local-oscillator (OLO) source 156. O/E converter 160 has (i) two input ports labeled S and R and (ii) four output ports labeled 1 through 4. Input port S receives optical signal 130' from optical communication link 140. Input port R receives an OLO signal 158 generated by OLO source 156. OLO signal 158 has an optical-carrier frequency (wavelength) that is sufficiently close to that of signal 130' to enable coherent (e.g., intradyne) detection of the latter signal. OLO signal 158 can be generated, e.g., using a relatively stable tunable laser whose output wavelength (frequency) is approximately the same as the carrier wavelength (frequency) of optical signal 130'.

In an example embodiment, O/E converter 160 operates to mix input signal 130' and OLO signal 158 to generate eight different mixed (e.g., by interference) optical signals (not explicitly shown in FIG. 1), e.g., eight such mixed signals for differential I/Q detection for two polarizations. O/E converter 160 then uses one or more photodetectors (e.g., one or more photodiodes, not explicitly shown in FIG. 1) to convert the set of mixed optical signals into four electrical signals 162₁-162₄ that are indicative of complex values corresponding to the two orthogonal-polarization components of signal 130'. For example, electrical signals 162₁ and 162₂ may be an approximate analog I signal and an approximate analog Q signal, respectively, corresponding to a first (e.g., horizontal, h) polarization component of signal 130'. Electrical signals 162₃ and 162₄ may similarly be an approximate analog I signal and an approximate analog Q signal, respectively, corresponding to a second (e.g., vertical, v) polarization component of signal 130'. Note that the orientation of the h and v polarization axes at receiver 190 may or may not coincide with the orientation of the X and Y polarization axes at transmitter 110.

In an example embodiment, the signal-mixing functionality of O/E converter 160 can be implemented using one or more optical hybrids.

Each of electrical signals 162₁-162₄ generated by O/E converter 160 is converted into digital form in a corresponding one of ADCs 166₁-166₄. Optionally, each of electrical signals 162₁-162₄ may be amplified in a corresponding electrical amplifier (e.g., a transimpedance amplifier, TIA; not explicitly shown in FIG. 1) prior to the resulting signal being converted into digital form. Digital signals 168₁-168₄ produced by ADCs 166₁-166₄ are then processed by a DSP 170 to recover the data of the original input data stream 102 applied to transmitter 110. In an example embodiment, DSP 170 may perform, inter alia, one or more of the following: (i) electronic polarization de-multiplexing; (ii) signal equalization and/or dispersion compensation; (iii) mapping signal samples onto the fixed constellation determined during the training mode; and (iv) error correction based on the FEC encoding applied at DSP 112.

In an example embodiment, each of DSP 112 and DSP 170 includes a respective ANN. Example embodiments of DSP 112 and DSP 170 and the pertinent signal-processing method(s) that can be implemented therein are described in more detail below in reference to FIGS. 2-13.

As used herein, the term "ANN" refers to a distributed and typically nonlinear trainable circuit or machine constructed using a plurality of processing elements (PEs). Also, an ANN may be dynamically adaptive. Each PE has connections with one or more other PEs. The plurality of connections between the PEs defines the ANN's topology. In some topologies, the PEs may be aggregated into layers. Different layers may have different types of PEs configured to perform different respective kinds of transformations on their inputs. Signals may travel from the first PE layer (typically referred to as the input layer) to the last PE layer (typically referred to as the output layer). In some topologies, the ANN may have one or more intermediate PE layers (typically referred to as the hidden layers) located between the input and output PE layers. An example PE may scale, sum, and bias the incoming signals and use an activation function to produce an output signal that is a static nonlinear function of the biased sum. The resulting PE output may become either one of the ANN's outputs or be sent to one or more other PEs through the corresponding connection(s). The respective weights and/or biases applied by individual PEs can be changed during the training mode and are typically fixed (constant) during the payload mode.

Some additional features and characteristics that may be pertinent to the definition of the term "ANN" are reviewed, e.g., in E. Guresen, G. Kayakutlu, "Definition of Artificial Neural Networks with Comparison to Other Networks," Procedia Computer Science, 3 (2011), pp. 426-433, which is incorporated herein by reference in its entirety.

In an example embodiment, an ANN can be implemented using one or more of the following: (i) a software program executed by a general-purpose or specialized electronic processor; (ii) a field-programmable gate-array (FPGA) device; and (iii) an application-specific integrated circuit (ASIC). Some ANNs can be implemented using an optical processor, e.g., as described in U.S. Pat. No. 7,512,573, which is incorporated herein by reference in its entirety.

In an example embodiment, a PE can be implemented using one or more of the following electrical circuits: (i) a multiplier circuit; (ii) an adder; (iii) a comparator; and (iv) a nonvolatile-memory cell.

Figure 2:
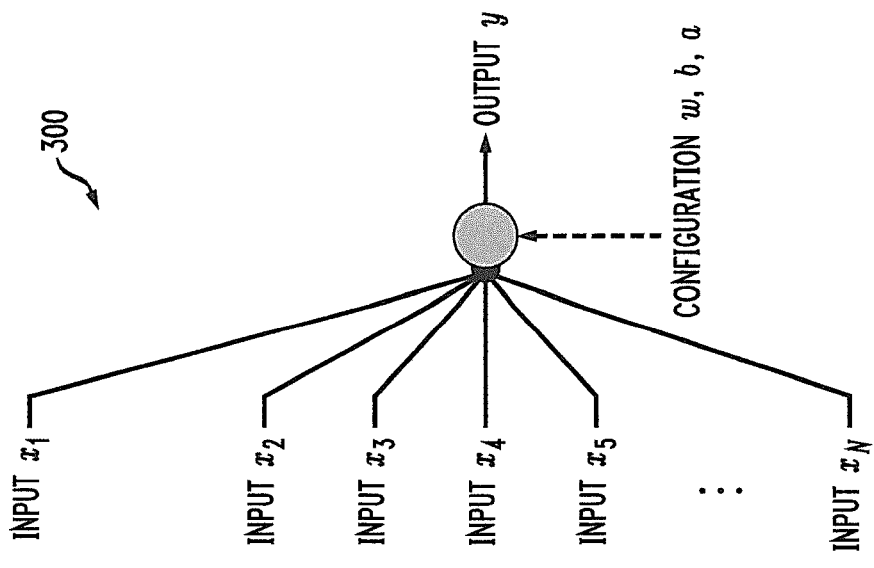
FIG. 2 shows a block diagram of a processing element (PE) that can be used in the optical communication system of FIG. 1 according to an embodiment.

FIG. 2 schematically illustrates a block diagram of a PE 200 that can be used in DSP 112 and/or DSP 170 according to an embodiment. PE 200 is a multiple-input/single-output (MISO) device having N inputs (labeled $x_1, x_2, \ldots, x_N$) and a single output (labeled y), where N is a positive integer greater than one. Each of the inputs $x_1, x_2, \ldots, x_N$ is applied to a respective input port of PE 200 and can deliver a real number or an integer. Collectively, the inputs $x_1, x_2, \ldots, x_N$ can be represented by a column vector $x=(x_1, x_2, \ldots, x_N)^T$, where the superscript T denotes the transpose.

The configuration of PE 200 is determined by the weight vector w, the bias b, and the scalar function $f(\cdot)$. The weight vector $w=(w_1, w_2, \ldots, w_N)^T$ has N scalar components. In operation, an example of PE 200 may compute the output y in accordance with Eq. (1):

$$y = f(w^T x + b) \tag{1}$$

where $w^T x$ denotes the dot product of vectors $w^T$ and x. The scalar function $f(\cdot)$ depends on the embodiment and can be, e.g., one of the following:

$$f(z) = \max(0, z) \tag{2a}$$

$$f(z) = \max(\gamma z, z) \tag{2b}$$

$$f(z) = 1/(1 + \exp(-z)) \quad (2c)$$

$$f(z) = \tanh(z) \quad (2d)$$

$$f(z) = \int_0^z \frac{dt}{\cosh(t)} \quad (2e)$$

where $0<\gamma<1$. The functions defined by Eqs. (2a)-(2e) are also sometimes referred to as the rectified linear unit (ReLU) function, leaky rectified linear unit (LReLU) function, sigmoid function, hyperbolic tangent function, and Gudermannian function, respectively.

In a typical configuration of PE 200, multiple copies of the output y may be generated and applied to the respective input ports of the corresponding different PEs connected to PE 200.

Figure 3:
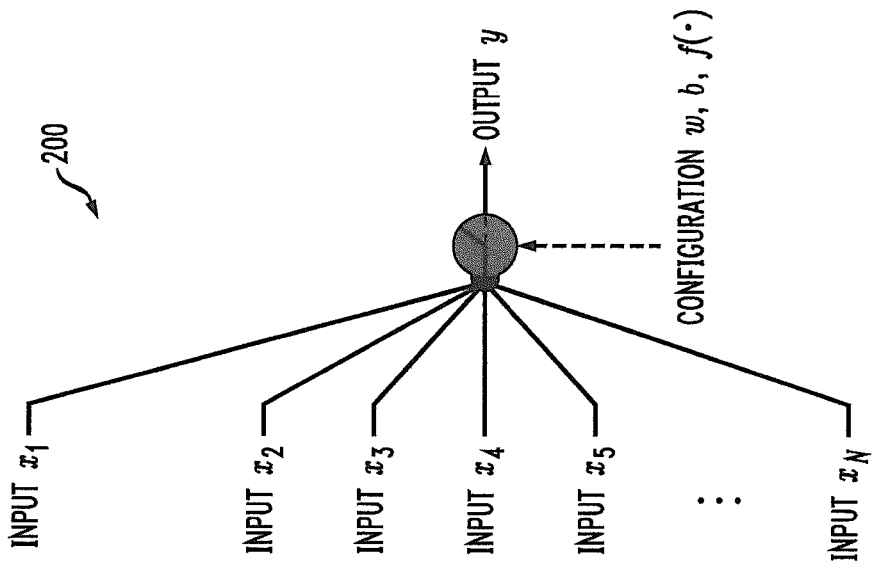
FIG. 3 shows a block diagram of another PE that can be used in the optical communication system of FIG. 1 according to an embodiment.

FIG. 3 schematically illustrates a block diagram of a PE 300 that can be used in DSP 112 according to an embodiment. PE 300 is generally similar to PE 200, except that PE 300 computes the output y in accordance with Eq. (3):

$$y = \alpha(w^T x + b) \quad (3)$$

where $\alpha$ is a scaling variable selected such that the average power of output y is constrained to a certain fixed value. PE 300 may sometimes be referred to as the "normalization node."

In some embodiments, the scaling variable $\alpha$ may not be used as a separate PE-configuration parameter, but rather be incorporated into each of the weight vector w and the bias b by redefining those quantities as $\alpha w$ and $\alpha b$, respectively.

Figure 4:
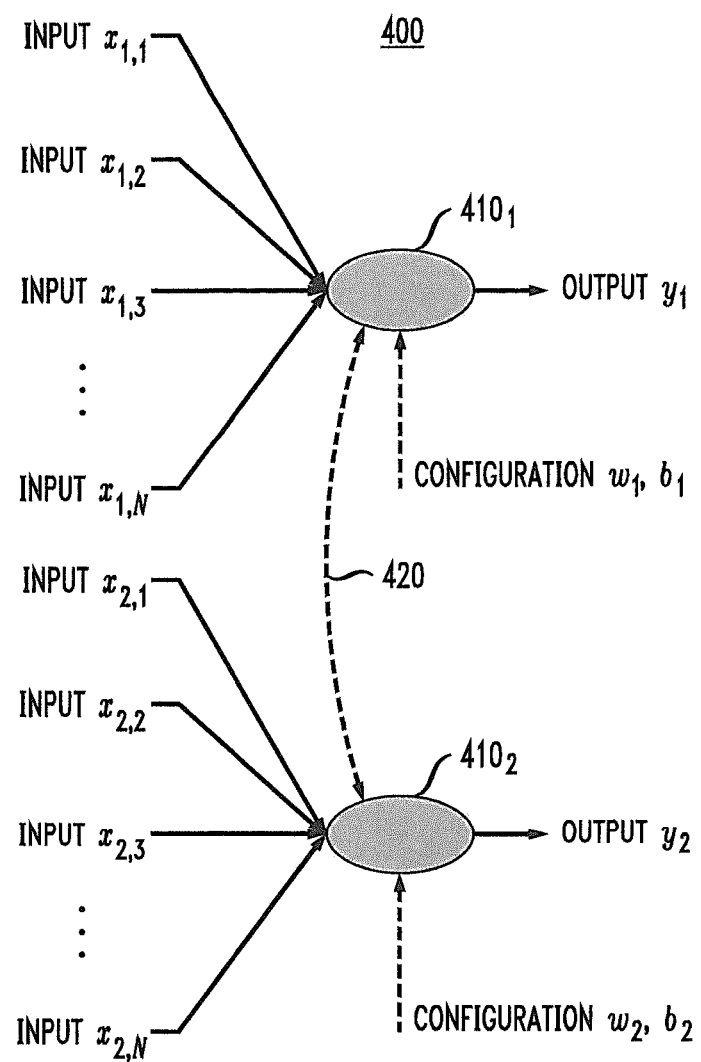
FIG. 4 shows a block diagram of a group of PEs that can be used in the optical communication system of FIG. 1 according to an embodiment.

FIG. 4 schematically illustrates a block diagram of a group 400 of PEs 410 that can be used in DSP 170 according to an embodiment. In general, a group 400 may have G PEs 410, where G is a positive integer greater than one. For illustration purposes and without any implied limitations, FIG. 4 shows a group 400 for which G=2. The corresponding two PEs 410 are labeled in FIG. 4 as $410_1$ and $410_2$, respectively. An individual PE 410 may sometimes be referred to as the "softmax node."

Each PE $410_i$ (where i=1, 2, . . . , G) has N inputs and one output. The N inputs to PE $410_i$ can be represented by the column vector $x_i = (x_{i,1}, x_{i,2}, \ldots, x_{i,N})^T$. The configuration of PE $410_i$ is determined by the weight vector $w_i = (w_{i,1}, w_{i,2}, \ldots, w_{i,N})^T$ and the bias $b_i$.

In operation, PE $410_i$ may compute the output $y_i$ in two steps. For example, during the first step, PE $410_i$ may compute an intermediate result $Y_i$ in accordance with Eq. (4):

$$Y_i = w_i^T x_i + b_i \quad (4)$$

This intermediate result $Y_i$ can then be shared, e.g., by way of connections 420, with other PEs 410 of the same group 400. During the second step, PE 410i may use the shared intermediate results $Y_i$ of that group 400 to compute the output $y_i$ in accordance with Eq. (5):

$$y_i = \frac{\exp(-Y_i)}{\sum_{j=1}^{G} \exp(-Y_j)} \quad (5)$$

Figure 5:
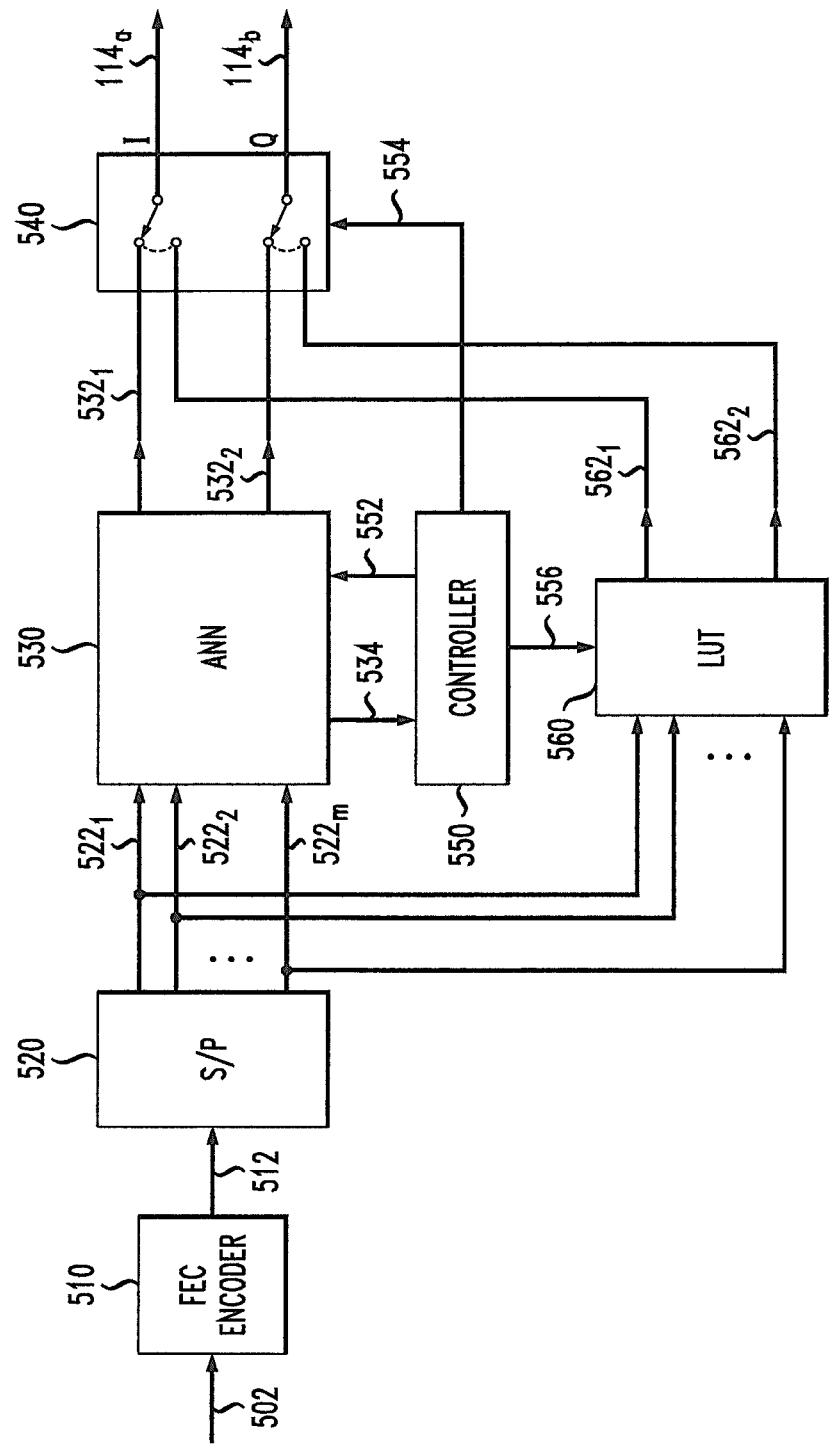
FIG. 5 shows a block diagram of a digital circuit that can be used in the transmitter of the optical communication system of FIG. 1 according to an embodiment.

FIG. 5 shows a block diagram of a digital circuit 500 that can be used in DSP 112 of transmitter 110 (FIG. 1) according to an embodiment. More specifically, DSP 112 may employ two instances (nominal copies) of circuit 500, e.g., one per polarization. In operation, circuit 500 converts an input bit-stream 502 into digital signals 114a and 114b. For the first instance of circuit 500 in DSP 112, a=1 and b=2. For the second instance of circuit 500 in DSP 112, a=3 and b=4. During a training mode, input bit-stream 502 carries a pilot data sequence. During a payload mode, input bit-stream 502 carries payload data and can be generated, e.g., by demultiplexing input stream 102 (FIG. 1).

Circuit 500 comprises an FEC encoder 510 that uses a suitable FEC code, as known in the pertinent art, to add redundancy to input bit-stream 502, thereby converting the latter into an FEC-encoded bit-stream 512. A serial-to-parallel (S/P) converter 520 then converts bit-stream 512 into a plurality of bit-streams $522_1$-$522_m$, where m is a positive integer grater than one. In an example embodiment, the number m is related to the constellation size and represents the length of binary labels assigned to the constellation points. For example, the number M of constellation points in the used constellation and the number m may be related as $M=2^m$.

In some embodiments, S/P converter 520 can be a demultiplexer. In some other embodiments, S/P converter 520 can be configured to implement a more-complex linear transformation of bit-stream 502 into bit-streams $522_1$-$522_m$. For example, such more-complex transformation may include, e.g., data interleaving, suitable linear matrix operations, etc.

Circuit 500 further comprises an ANN 530 and a look-up table (LUT) 560, each of which is connected to receive a respective copy of bit-streams $522_1$-$522_m$. The state of a switch 540 determines whether the outputs of ANN 530 or the outputs of LUT 560 are used to generate digital signals $114_a$ and $114_b$. In an example embodiment, an electronic controller 560 is configured to use a control signal 554 to cause switch 540 to: (i) use the outputs of ANN 530 during the training mode and (ii) use the outputs of LUT 560 during the payload mode.

In some embodiments, LUT 560 may not be used and, as such, can be disabled, disconnected, or removed from circuit 500. In such embodiments, the outputs of ANN 530 are used to generate digital signals $114_a$ and $114_b$ in both training and payload modes. Note however that controller 550 can use a control signal 552 to change the PE-configuration parameters of ANN 530 during the training mode, e.g., as described in reference to FIG. 10. In contrast, the PE-configuration parameters of ANN 530 remain constant during the payload mode.

In each time slot, ANN 530 uses the respective input bit-word provided by the bits of bit-streams $522_1$-$522_m$ to generate an output symbol, the I-component of which is carried by a digital output signal $532_1$, and the Q-component of which is carried by a digital output signal $532_2$. When the PE-configuration parameters of ANN 530 are constant, the conversion of the input bit-word into the I and Q values performed by the ANN is deterministic. That is: the same input bit-word received via bit-streams $522_1$-$522_m$ results in the same (I,Q) pair for digital output signals 5321 and 5322. The latter property of ANN 530 can beneficially be used to reduce the computational load of DSP 112 using LUT 560 instead of ANN 530.

For example, upon completion of the training mode, controller 550 can use control signals 534 and 556 to load LUT 560 by saving therein a respective (I,Q) pair for each different input bit-word. Then, during the payload mode, the saved (I,Q) pairs can be read out from LUT 560 and applied to LUT outputs 5621 and 5622 to reproduce the response of ANN 530 to the same input bit-words. The use of LUT 560 instead of ANN 530 can reduce the computational load in circuit 500, e.g., because a LUT is typically a simpler circuit than an ANN.

Figure 6:
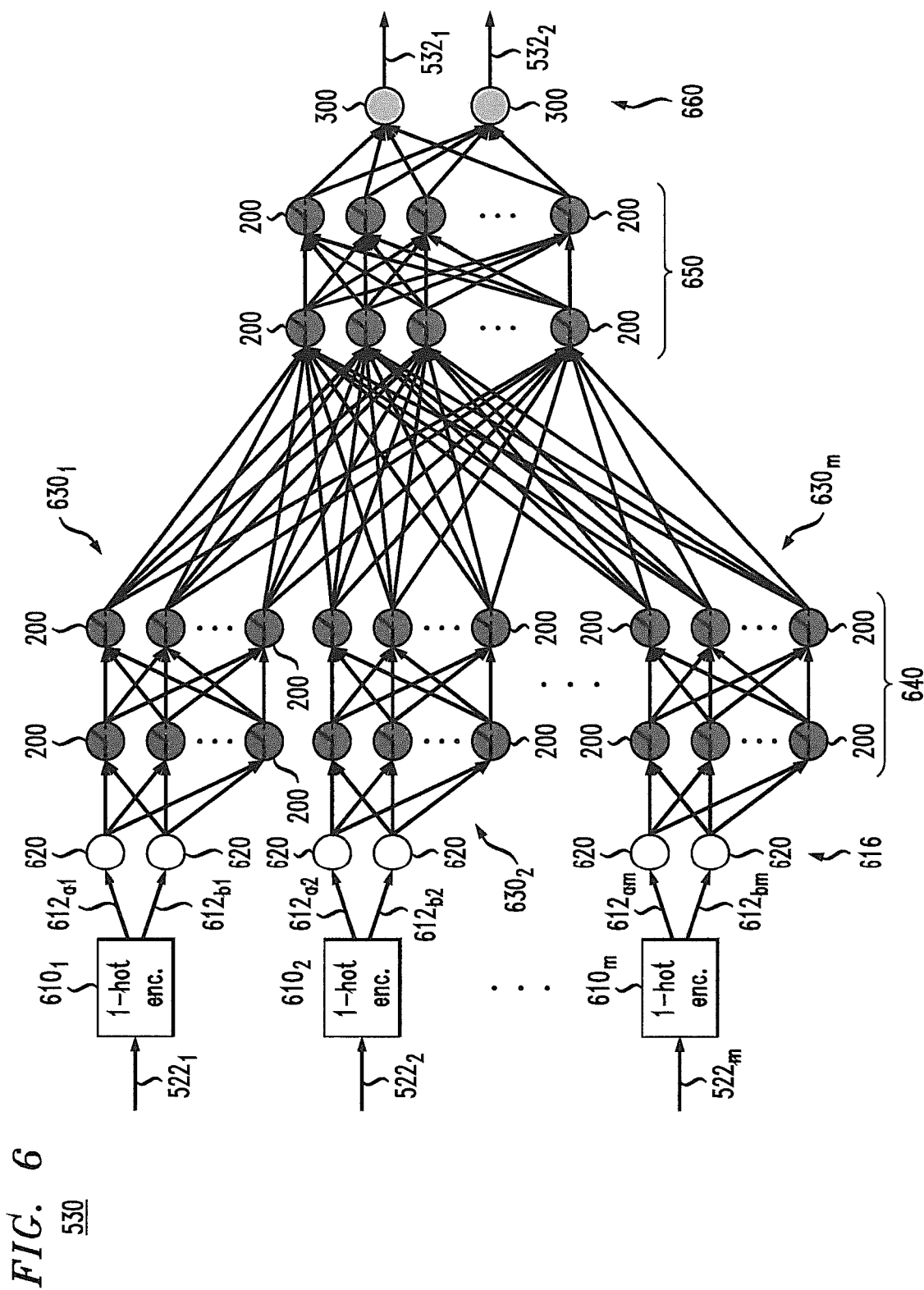
FIG. 6 shows a block diagram of an artificial neural network (ANN) that can be used in the digital circuit of FIG. 5 according to an embodiment.

FIG. 6 shows a block diagram of ANN 530 according to an embodiment. Digital signals $522_1$-$522_m$ and $532_1$-$532_2$ are also shown in FIG. 6 to better illustrate the relationship between the circuits of FIGS. 5 and 6.

ANN 530 comprises one-hot vector encoders $610_1$-$610_m$, each configured to receive a respective one of digital signals $522_1$-$522_m$. In operation, an encoder $610_i$ (where i=1, 2, ..., m) generates digital output signals $612_{ai}$ and $612_{bi}$. More specifically, in response to a binary "one" applied thereto by the corresponding input 522, encoder $610_i$ outputs a binary "zero" for signal $612_{ai}$ and a binary "one" for signal $612_{bi}$. In response to a binary "zero" applied thereto by the corresponding input 522, encoder $610_i$ outputs a binary "one" for signal $612_{ai}$ and a binary "zero" for signal $612_{bi}$.

ANN 530 further comprises an input layer 616, a bit-level section 640, a symbol-level section 650, and an output layer 660.

Input layer 616 comprises a plurality of PEs 620, each pair of which is connected to a respective one of encoders $610_1$-$610_m$. The output of each PE 620 is copied an appropriate number of times, and the resulting copies are applied to PEs 200 of a corresponding portion 630 of section 640. In an example embodiment, each PE 620 can be implemented using a suitable embodiment of PE 200 (FIG. 2) or PE 300 (FIG. 3). In some embodiments, each PE 620 may be configured to simply generate multiple copies of its input and apply each copy to a respective one of its outputs.

Each portion 630 may have two or more layers of fully connected PEs 200. As used herein, the term "fully connected" should be interpreted to mean that the output of a PE 200 of one PE layer of portion 630 is received by each PE 200 of the next PE layer of that portion 630. For illustration purposes and without any implied limitations, FIG. 6 shows only two PE layers in each portion 630. However, a person of ordinary skill in the art will readily understand how to connect additional PE layers therein.

Different portions 630 of section 640 are not directly connected to one another. For example, PEs 200 of portion $630_1$ do not apply any of their outputs to any PEs 200 of portion $630_2$ or $630_m$. PEs 200 of portion $630_2$ do not apply any of their outputs to any PEs 200 of portion $630_1$ or $630_m$, etc. As a result, each of portions $630_1$-$630_m$ responds only to the corresponding one of digital signals $522_1$-$522_m$, and does not respond to any other ones of those digital signals.

Section 650 may comprise two or more layers of fully connected PEs 200. A PE 200 of the first PE layer of section 650 is connected to receive outputs from each PE 200 of the last PE layers of portions $630_1$-$630_m$. For illustration purposes and without any implied limitations, FIG. 6 shows only two PE layers in section 650. However, a person of ordinary skill in the art will readily understand how to connect additional PE layers therein.

In some embodiments, section 650 may have a single layer of PEs 200.

Output layer 660 comprises two PEs 300, each connected to receive outputs from each PE 200 of the last PE layer of section 650. The output of one PE 300 of output layer 660 is digital signal 5321 (also see FIG. 5). The output of the other PE 300 of output layer 660 is digital signal 5322 (also see FIG. 5).

A person of ordinary skill in the art will understand that the embodiment of ANN 530 shown in FIG. 6 is designed to process two-dimensional constellation symbols, e.g., represented by the I and Q components (corresponding to the two dimensions on the complex plane). However, possible embodiments of the ANNs that can be used in system 100 are not so limited. From the provided description, a person of ordinary skill in the art will be able to make and use other embodiments, in which the corresponding ANNs are configured to process constellation symbols whose dimensionality differs from two.

As used herein, the term "constellation symbol" should be construed to encompass both constellation symbols of a one-dimensional constellation and of a multi-dimensional constellation. An example one-dimensional constellation enables the transmission of a single constellation symbol in a single signaling interval (time slot) over a single dimension of the carrier. In contrast, a multi-dimensional constellation enables the transmission of a single constellation symbol using multiple signaling intervals and/or multiple dimensions of the carrier and/or link. For example, a d-dimensional constellation can be constructed using d different one-dimensional constellations or d copies of the same one-dimensional constellation. Examples of possible dimensions that can be used for these purposes include but are not limited to time, quadrature, polarization, spatial mode, and carrier frequency.

For example, the embodiments of FIGS. 5-6 can be modified to be able to process four-dimensional constellation symbols, which can then be transmitted using two orthogonal (e.g., X and Y) polarizations of the carrier. These modifications may, e.g., include the following.

S/P converter 520 can be modified to convert bit-stream 512 into 2m bit-streams $522_1$-$522_{2m}$.

ANN 530 can be modified to generate four digital output signals, wherein digital output signals $532_1$-$532_2$ provide values for the I- and Q-components, respectively, of the X-polarization, and the two additional digital output signals provide values for the I- and Q-components, respectively, of the Y-polarization.

LUT 560 can be modified to have 2m inputs and four outputs.

Switch 540 can be modified to generate digital signals $114_1$-$114_4$ (also see FIG. 1) by selecting either the four outputs of the modified ANN 530 or the four outputs of the modified LUT 560.

Figure 7:
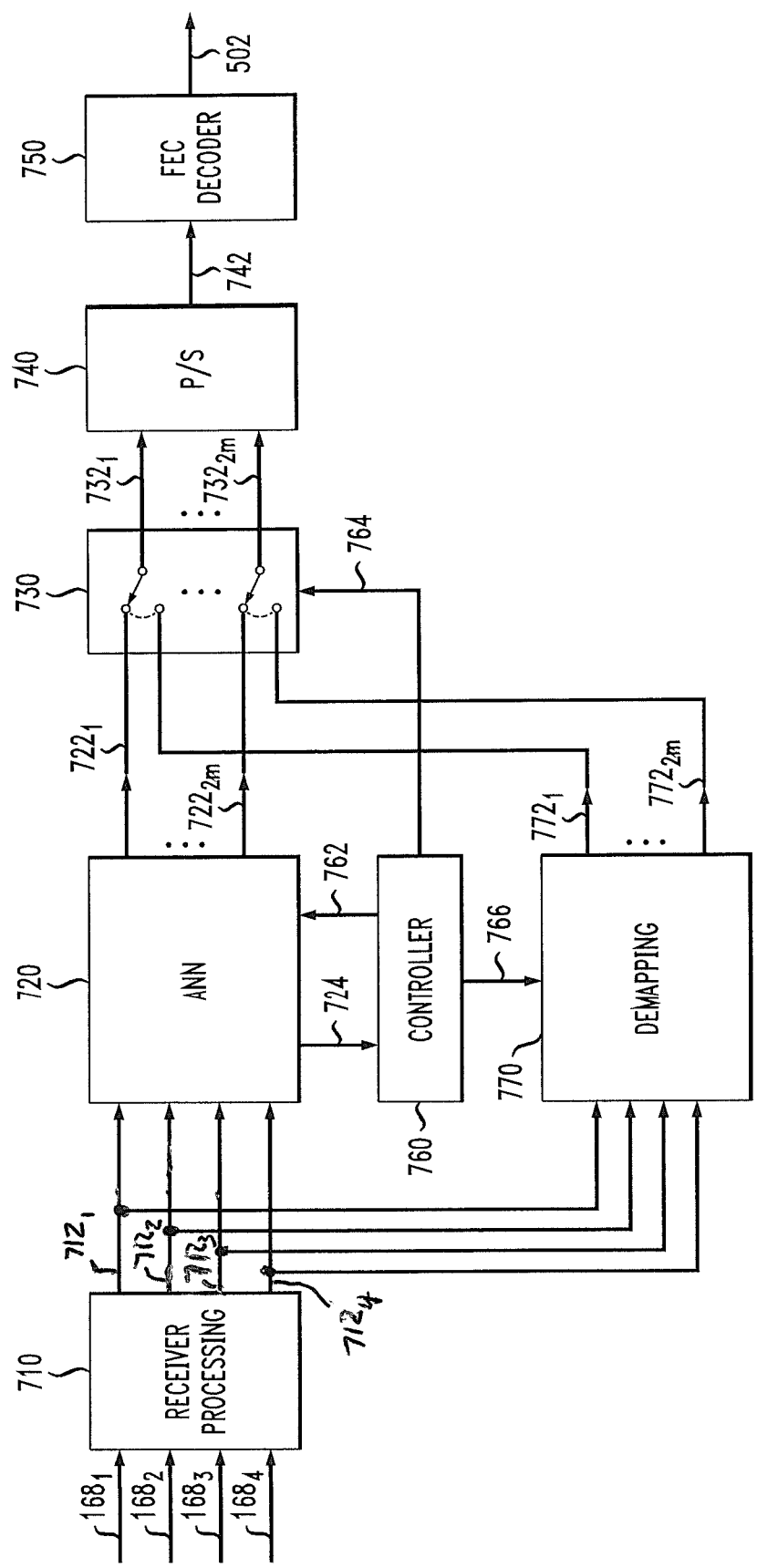
FIG. 7 shows a block diagram of a digital circuit that can be used in the receiver of the optical communication system of FIG. 1 according to an embodiment.

FIG. 7 shows a block diagram of a digital circuit 700 that can be used in DSP 170 of receiver 190 (FIG. 1) according to an embodiment. In operation, circuit 700 converts digital signals $168_1$-$168_4$ (FIG. 1) into output bit-stream 502 (also see FIG. 5).

Circuit 700 comprises a receiver-processing circuit 710 configured to convert digital signals $168_1$-$168_4$ into digital signals $712_1$-$712_4$. The signal processing implemented in circuit 710 may include some of the signal-processing operations performed in the DSP chain of conventional coherent optical receivers prior to constellation demapping. Such signal-processing operations may include, e.g., one or more of the following: (i) reduction of signal distortions caused by front-end circuit 172 (FIG. 1); (ii) electronic polarization rotation and/or demultiplexing; (iii) clock recovery; (iv) OLO phase and/or frequency-offset correction, etc.

Circuit 700 further comprises an ANN 720 and a demapping circuit 770, each of which is connected to receive a respective copy of digital signals $712_1$-$712_4$. The state of a switch 730 determines whether the outputs of ANN 720 or the outputs of demapping circuit 770 are applied to a parallel-to-serial (P/S) converter 740. In an example embodiment, an electronic controller 760 is configured to use a control signal 764 to cause switch 730 to pass through:

(i) the outputs of ANN 720 during the training mode, and (ii) the outputs of demapping circuit 770 during the payload mode.

In some embodiments, demapping circuit 770 may not be used and, as such, can be disabled, disconnected, or removed from circuit 700. In such embodiments, the outputs of ANN 720 are applied to P/S converter 740 in both training and payload modes. Note however that controller 760 can use a control signal 762 to change the PE-configuration parameters of ANN 720 during the training mode, e.g., as described in reference to FIG. 10. In contrast, the PE-configuration parameters of ANN 720 remain constant during the payload mode.

In each time slot, ANN 720 uses two respective (I,Q) pairs provided by the input digital signals ($712_1$, $712_2$) and ($712_3$, $712_4$), respectively, to generate two corresponding bit-words, each having m bits. The m bits of the first of the two bit-words is carried by digital output signals $722_1$-$722_m$. The m bits of the second of the two bit-words is carried by digital output signals $722_{m+1}$-$722_{2m}$.

When the PE-configuration parameters of ANN 720 are constant, the conversion of each of the input (I,Q) pairs performed by the ANN can be alternatively represented by a mapping operation configured to use a respective plurality of decision maps, each corresponding to a respective bit of the output bit-word. Each of the decision maps divides the I-Q plane into two portions, the first portion representing the binary "one," and the second portion representing the binary "zero." The input (I,Q) pair provided by the input digital signals ($712_1$, $712_2$) or ($712_3$, $712_4$) can then be used as the coordinates of the corresponding sample point on each of the decision maps to convert that (I,Q) pair into the output bit-word as follows. If the sample point falls within the first portion of the map, then the corresponding bit of the output bit-word is set to binary "one." If the sample point falls within the second portion of the map, then the corresponding bit of the output bit-word is set to binary "zero." An example plurality of decision maps that can be used for this purpose is shown in FIGS. 13A-13D.

In some embodiments, the map-based representation of the conversion performed by ANN 720 can beneficially be used to reduce the computational load of DSP 170 using demapping circuit 770 instead of ANN 720. For example, upon completion of the training mode, controller 760 can use control signals 724 and 766 to: (i) generate the above-described decision maps using the PE configuration parameters of ANN 720; and (ii) load the generated decision maps into demapping circuit 770. Then, during the payload mode, the loaded decision maps can be used by demapping circuit 770 to perform the above-described conversion of the input (I,Q) pairs provided thereto by the input digital signals ($712_1$, $712_2$) and ($712_3$, $712_4$) to reproduce the response of ANN 720 to the same input (I,Q) pairs. The resulting bit-words are then used to generate digital output signals $772_1$-$772_{2m}$. In each time slot, the m bits of the first of the two bit-words is carried by digital output signals $772_1$-$772_m$, and the m bits of the second of the two bit-words is carried by digital output signals $772_{m+1}$-$772_{2m}$.

In some embodiments, the use of demapping circuit 770 instead of ANN 720 may reduce the computational load in circuit 700, e.g., because at least some mapping circuits may be less complicated than ANN 720.

A parallel-to-serial (P/S) converter 740 operates to serialize bit-streams $732_1$-$732_{2m}$ outputted by switch 730, thereby generating a bit-streams 742. In an example embodiment, the serialization operation performed by P/S converter 740 is configured to be the inverse of the de-serialization operations performed by the corresponding S/P converter 520 (FIG. 5) located at transmitter 110 (FIG. 1). As a result, in the absence of errors, bit-stream 742 is the same as bit-stream 512.

An FEC decoder 750 operates to apply the operative FEC code to correct errors and remove redundancy from bit-stream 742, as known in the pertinent art, thereby recovering bit-stream 502 (also see FIG. 5).

Figure 8:
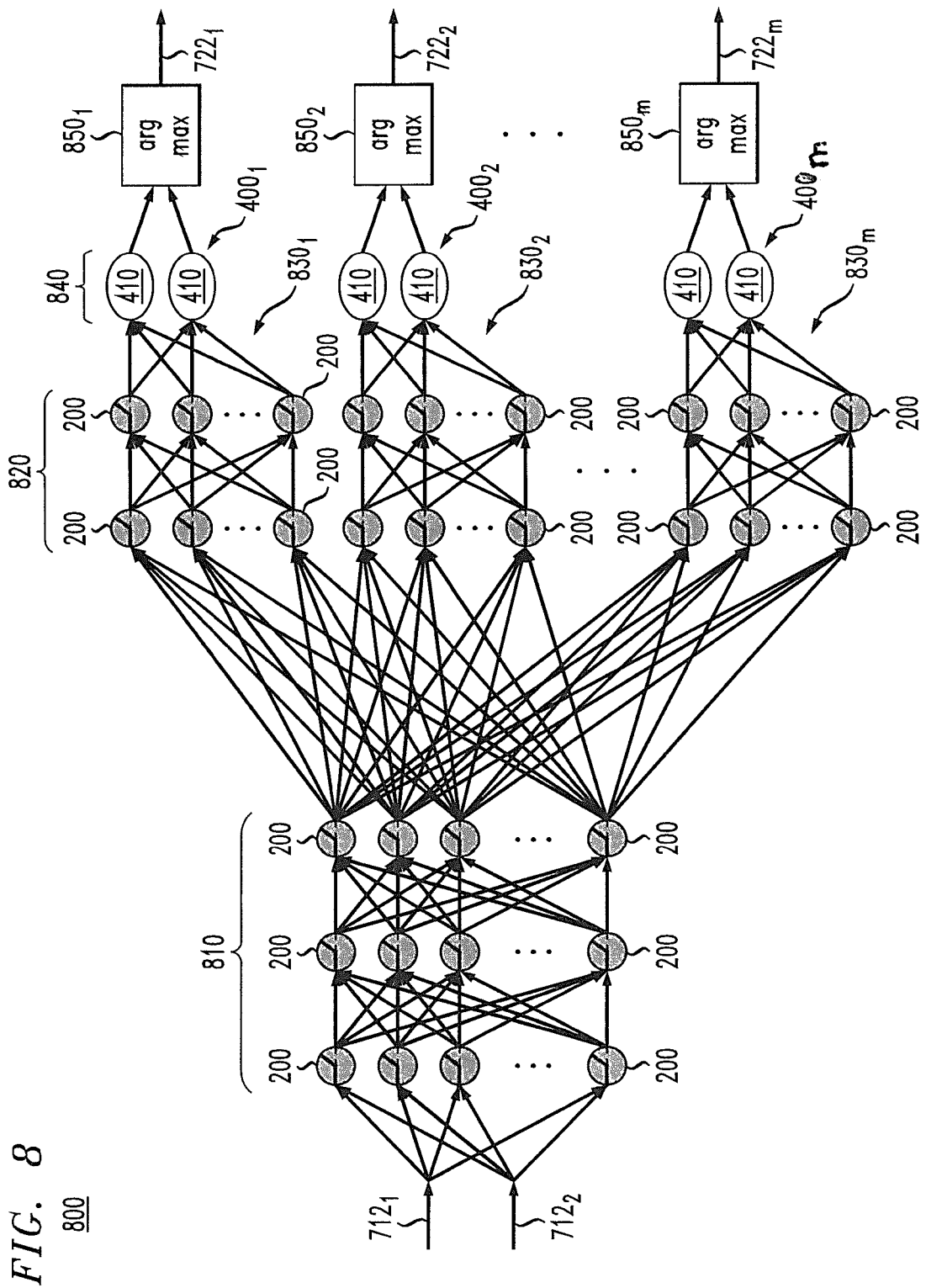
FIG. 8 shows a block diagram of an ANN that can be used in the digital circuit of FIG. 7 according to an embodiment.
Figure 9:
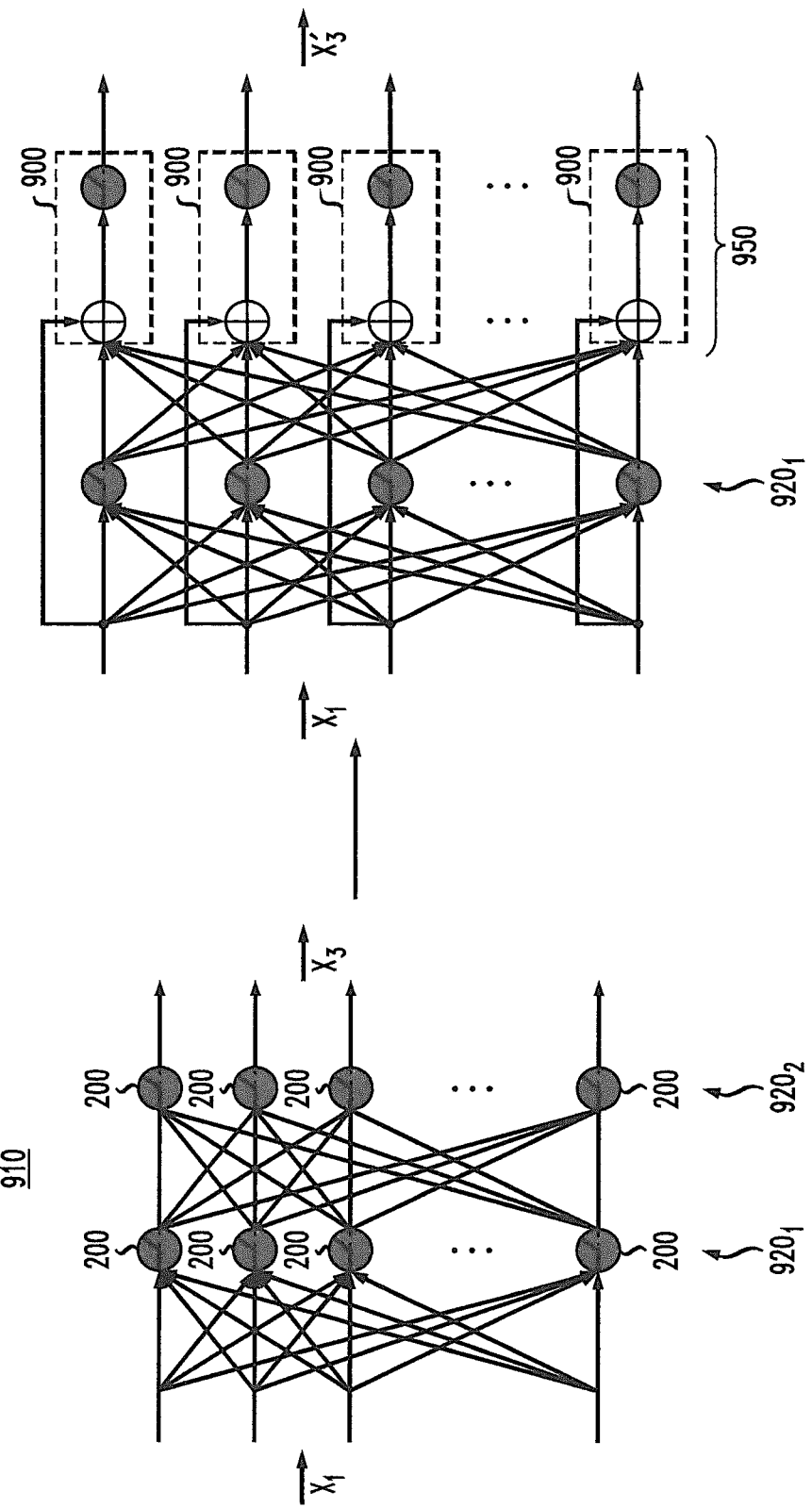
FIGS. 9A-9B illustrate a circuit modification that can be used to implement any or all of the ANNs used in the optical communication system of FIG. 1 according to an embodiment.

FIG. 8 shows a block diagram of an ANN 800 that can be used to implement ANN 720 according to an embodiment. For illustration purposes and without any implied limitations, ANN 800 is shown to process digital signals $712_1$ and $712_2$ and to generate digital signals $722_1$-$722_2$. As such, ANN 800 can be used to process signals in a manner compatible with the processing implemented in ANN 530 (see FIGS. 5-6). ANN 800 can be modified in a straightforward manner, e.g., as described further below, to process digital signals $712_1$-$712_4$ and to generate digital signals $722_1$-$722_{2m}$ for processing signals corresponding to two polarizations.

ANN 800 comprises a symbol-level section 810, a bit-level section 820, and an output layer 840.

Section 810 may comprise two or more layers of fully connected PEs 200. A PE 200 of the first PE layer of section 810 is connected to respective copies of input digital signals $712_1$ and $712_2$. A PE 200 of the last PE layer of section 810 is connected to apply copies of its output to each PE 200 of the first PE layer of section 820. For illustration purposes and without any implied limitations, FIG. 8 shows three PE layers in section 810. However, a person of ordinary skill in the art will readily understand how to connect additional PE layers therein or to remove one PE layer.

In some embodiments, section 810 may comprise a single layer of PEs 200.

Section 820 comprises portions $830_1$-$830_m$. Different portions 830 of section 820 are not directly connected to one another. For example, PEs 200 of portion $830_1$ do not apply any of their outputs to any PEs 200 of portion $830_2$ or $830_m$. PEs 200 of portion $830_2$ do not apply any of their outputs to any PEs 200 of portion $830_1$ or $830_m$, etc.

Output layer 840 comprises groups $400_1$-$400_m$, each having two respective PEs 410 (i.e., G=2; also see FIG. 4). Each PE 410 of group $400_j$ (where j=1, 2, . . . , m) is connected to: (i) receive copies of the outputs from PEs 200 of the last PE layer of portion $830_j$ of section 820; and (ii) apply its output to an arg-max circuit $850_j$. In each time slot, arg-max circuit $850_j$ operates to: (i) compare the outputs of the two PEs 410 of group $400_j$ and (ii) generate a binary value for output bit-stream $722_j$ based on the comparison. More specifically, if the output of PE $410_1$ of group $400_j$ is greater than the output of PE $410_2$ of that group (also see FIG. 4), then arg-max circuit $850_j$ generates a binary "zero" for output bit-stream $722_j$. Otherwise, arg-max circuit $850_j$ generates a binary "one" for output bit-stream $722_j$.

To be able to process four-dimensional constellation symbols transmitted using two orthogonal (e.g., X and Y) polarizations of the carrier, ANN 800 can be modified, e.g., as follows.

Section 810 can be modified to receive four digital signals $712_1$-$712_4$.

Section 820 can be modified to have 2m portions 830.

Output layer 840 can be modified to have 2m groups 400, and the number of arg-max circuits 850 can accordingly be increased to 2m.

FIGS. 9A-9B illustrate a circuit modification that can be used to implement any or all of ANNs 530, 720, and 800 according to an embodiment. More specifically, FIG. 9A shows a block diagram of an ANN portion 910 that can be used in some of the above-described embodiments of ANNs 530, 720, and 800. FIG. 9B shows a block diagram of an ANN portion 940 that can be used to replace ANN portion 910 in some embodiments of ANNs 530, 720, and 800.

Referring to FIG. 9A, ANN portion 910 has two layers of PEs 200, which are labeled $920_1$ and $920_2$, respectively. In operation, ANN portion 910 converts an input vector $X_1$ into an output vector $X_3$ in accordance with Eqs. (6)-(7):

$$X_{3,i}=f_a(W_{2,i}^T X_2+b_{2,i}) \qquad (6)$$

$$X_{2,i}=f_a(W_{1,i}^T X_1+b_{1,i}) \qquad (7)$$

where $X_{3,i}$ is the i-th component of the output vector $X_3$; $f_a$ is the ReLU function (also see Eq. (2a)); $W_{2,i}$ is the weight vector used in the i-th PE 200 in PE layer $920_2$; $X_2$ is the output vector generated by PE layer $920_1$; $b_{2,i}$ is the bias used in the i-th PE 200 in PE layer $920_2$; $X_{2,i}$ is the i-th component of the output vector $X_2$; $W_{1,i}$ is the weight vector used in the i-th PE 200 in PE layer $920_1$; $b_{1,i}$ is the bias used in the i-th PE 200 in PE layer $920_1$; the superscript T denotes the transpose; i=1, 2, . . . , N; and N is the number of PEs 200 in each of PE layers $920_1$ and $920_2$.

Referring to FIG. 9B, ANN portion 940 uses a PE layer 950 instead of PE layer $920_2$. PE layer 950 has N PEs 900, each of which is configured to operate in accordance with Eq. (8):

$$X'_{3,i}=f_a(W_{2,i}^T X_2+b_{2,i}+X_{1,i}) \qquad (8)$$

where $X'_{3,i}$ is the i-th component of the output vector $X'_3$ generated by PE layer 950; and $X_{1,i}$ is the i-th component of the input vector $X_1$. As a result, the signal conversion performed by ANN portion 940 is described by Eqs. (6) and (8). As indicated by Eq. (8) and the circuit structure shown in FIG. 9B, each PE 900 is connected to receive a corresponding scalar component of the input vector $X_1$ in addition to the full vector $X_2$.

In some embodiments, the use of one or more ANN portions 940 in system 100 may be beneficial because such use may help to improve the system's training process and/or increase the speed of convergence of the optimization algorithm(s) used therefor.

Figure 10:
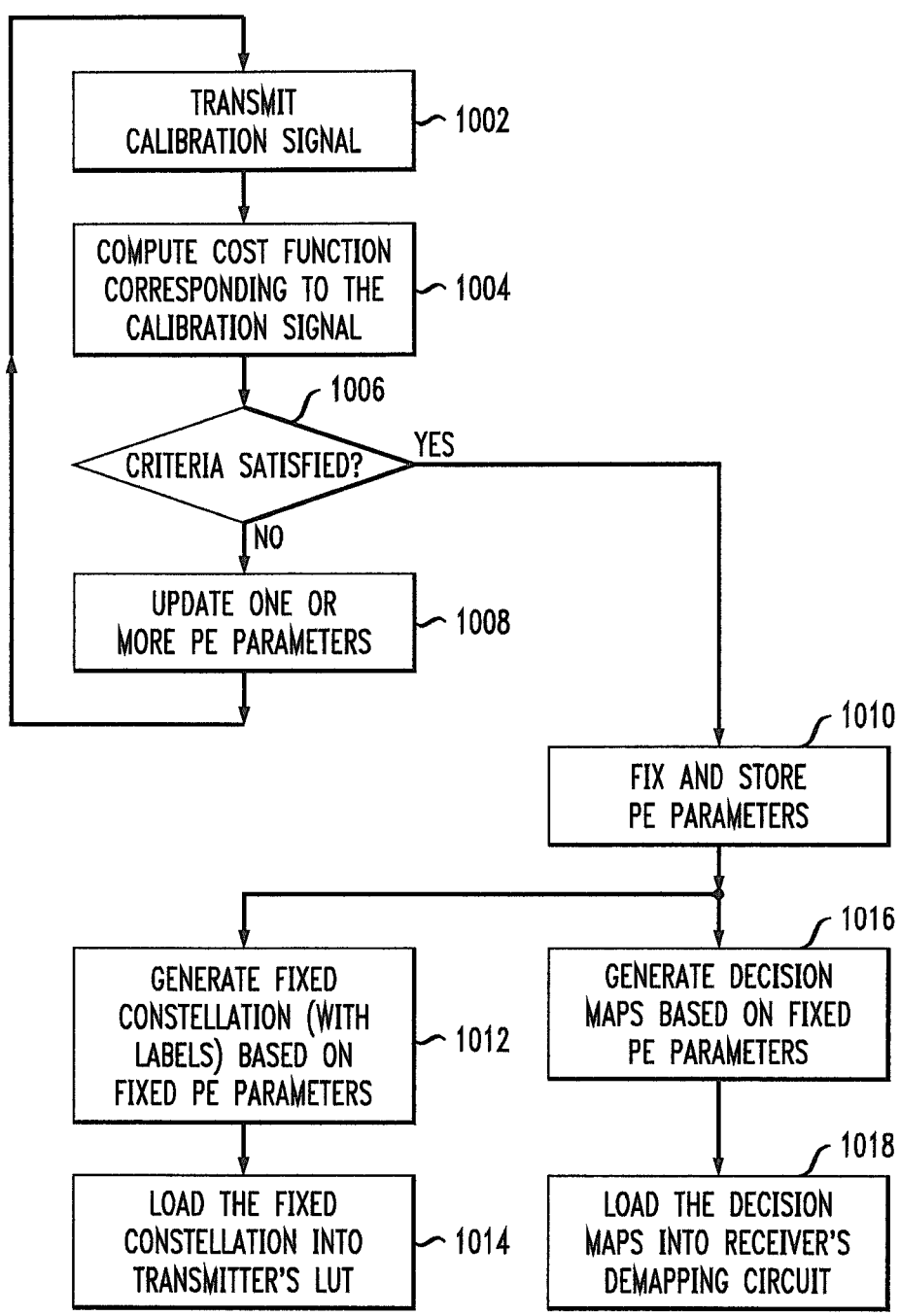
FIG. 10 shows a flowchart of a communication method that can be used in the optical communication system of FIG. 1 during a training mode according to an embodiment.

FIG. 10 shows a flowchart of a communication method 1000 that can be used in system 100 during a training mode according to an embodiment. For illustration purposes and without any implied limitations, the description of some steps of method 1000 may also refer to the specific examples shown in FIGS. 11-13.

At step 1002 of method 1000, system 100 is operated to transmit from transmitter 110 to receiver 190 a calibration signal 130 (also see FIG. 1). In an example embodiment, calibration signal 130 may carry pilot data sequences specifically designed, e.g., as known in the pertinent art, for ANN training purposes, wherein the transmitted forms of the pilot data sequences are known by both transmitter 110 and the receiver 190. Such common knowledge can be achieved, e.g., using control link 180 (FIG. 1).

At step 1004, the system controller (e.g., including controllers 550 and 760 and/or other pertinent entities corresponding to the control plane of system 100) computes a cost function L(•) based on at least some of the above-indicated signals (see, e.g., FIGS. 5-8) generated by transmitter 110 and receiver 190 during step 1002.

In an example embodiment, the cost function L(•) can be constructed to enable approximate minimization of the average cross entropy between the m parallel auto-encoders, each being coupled between the input represented by signal $522_i$ (FIG. 6) and the output represented by signal $722_i$ (FIG. 8), where i=1, 2, . . . , m. An example cost function L(•) that is suitable for this purpose is given by Eq. (9)

$$L(B_1, \ldots, B_m, Z_1, \ldots, Z_m) = \frac{1}{mM_B}\sum_{k=1}^{m}\sum_{i=1}^{M_a}\sum_{j=1}^{2} x_{k,i,j}\log z_{k,i,j} \qquad (9)$$

where $B_i=\{x_{i,1}, \ldots, x_{i,MB}\}$ is the mini-batch containing $M_B$ one-hot vectors $x_{i,j}$ generated by one-hot vector encoder $610_i$ (e.g., as described above in reference to FIG. 6) in response to a pilot data sequence used at step 1002; and $Z_i=\{z_{i,1}, \ldots, z_{i,MB}\}$ is the set of outputs $z_{i,j}$ generated by output layer 840 (FIG. 8) in response to the mini-batch $B_i$. In other embodiments, other suitable cost functions L(•) can alternatively be used.

In some embodiments, the cost function L(•) and/or the PE-parameter-update algorithm(s) used at step 1008 may rely on an approximate mathematical model of link 140 (FIG. 1).

Figure 11:
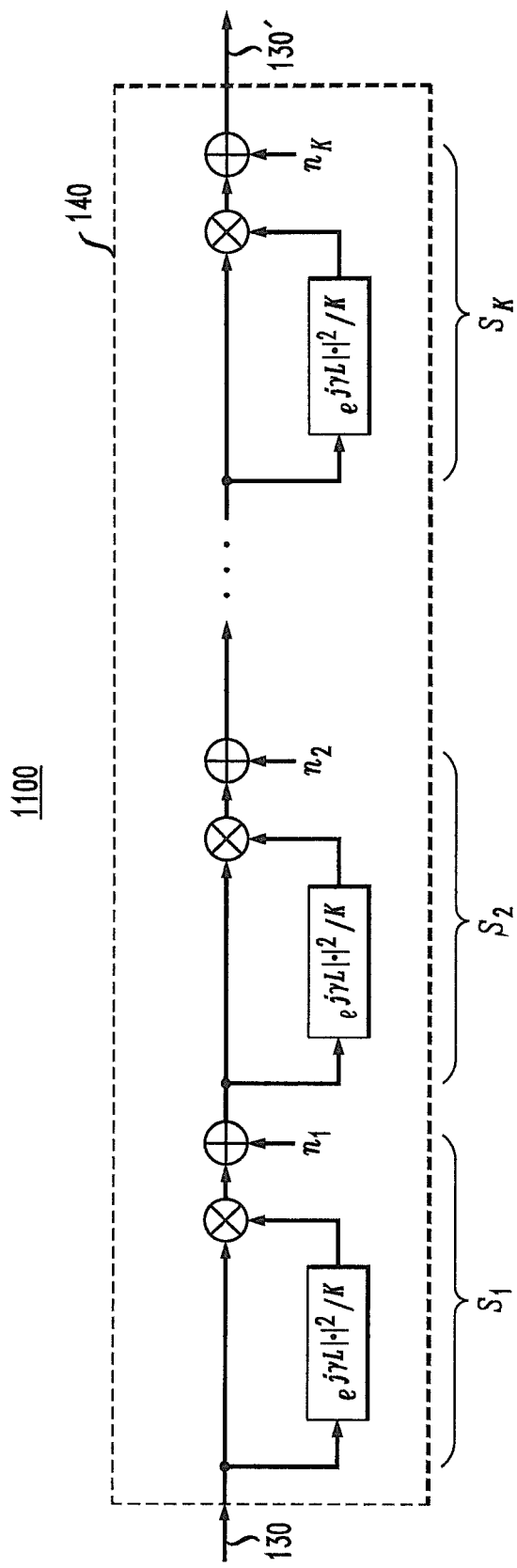
FIG. 11 shows a schematic representation of a mathematical model of the optical link that can be used in the communication method of FIG. 10 according to an embodiment.
Figure 13A:
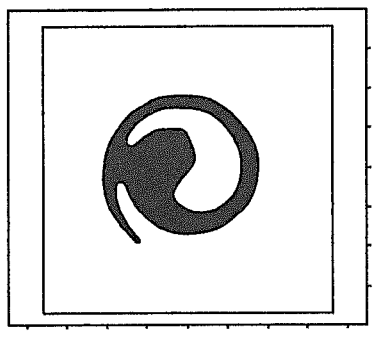
FIGS. 13A-13D graphically show an example set of decision maps that can be generated using the communication method of FIG. 10 according to an embodiment.
Figure 13B:
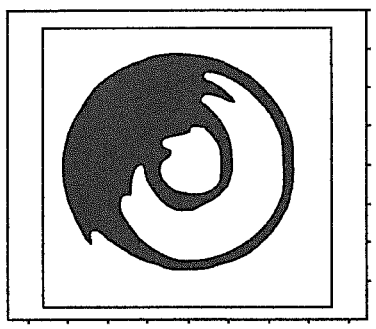
Figure 13C:
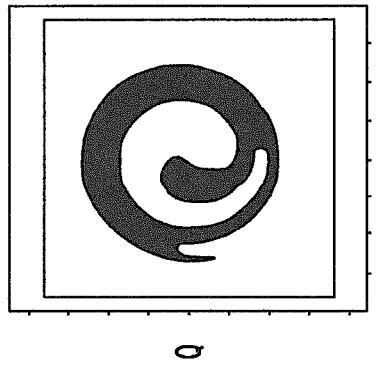
Figure 13D:
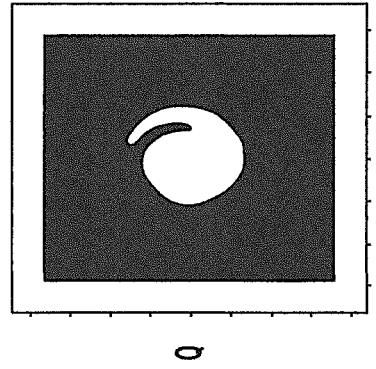

FIG. 11 shows a schematic representation of an example mathematical model 1100 of optical link 140 that can be used in method 1000 according to an embodiment. Model 1100 corresponds to an optical link characterized by zero dispersion and the nonlinearity coefficient γ. As an example, the value of the nonlinearity coefficient γ can be 1.27 W/km. Model 1100 represents optical link 140 as K serially connected stages $S_1, S_2, \ldots, S_K$. Each of these stages represents a section of optical fiber of length L/K, where L is the total length of fiber in link 140. Of course, other possible optical links 140 may have chromatic dispersion and/or nonlinear optical effects and, as such, may be modeled differently.

The effect of each stage $S_k$ on the optical signal applied thereto is to: (i) impose a phase rotation, the magnitude of which is proportional to the intensity (squared amplitude of the electrical field) of the optical signal; and (ii) add Gaussian noise. In FIG. 11, the phase rotation imposed by stage $S_k$ (where k=1, 2, . . . , K) is represented by the complex exponent $\exp(j\gamma|\bullet|^2 L/K)$, where $|\bullet|^2$ denotes the light intensity. The Gaussian noise imposed by stage $S_k$ is denoted therein as $n_k$. An example value of K can be between 10 and 100.

A person of ordinary skill in the art will understand that other mathematical models of link 140 can also be used and will be able to select or construct a suitable mathematical model based on the specific technical characteristics of link 140.

At step 1006 of method 1000, the system controller uses a predefined set of one or more criteria to evaluate the cost function L(•) computed at step 1004. If the criteria are not satisfied, then the processing of method 1000 is directed to step 1008. If the criteria are satisfied, then the processing of method 1000 is directed to step 1010.

Depending on the embodiment, step 1006 may include one or more of the following: (i) comparing the value of the cost function L(•) with one or more predetermined threshold values; (ii) comparing a change in the value of the cost function L(•) corresponding to two different executions of the processing loop 1002-1008 with one or more other predetermined threshold values; etc.

At step 1008, the system controller may use a suitable algorithm to change one or more PE-configuration parameters (e.g., see Eqs. (1), (3), (4), and (6)-(8)). As already indicated above, such an algorithm may be directed at minimizing the cost function L(•) and may rely, inter alia, on a mathematical model of optical link 140 (e.g., see FIG. 11). Upon execution of step 1008, the processing of method 1000 is directed back to step 1002.

At step 1010, the system controller causes the present values of the PE-configuration parameters to be fixed, e.g., by disabling further configuration updates. These parameters values may also be saved in a non-volatile memory for future use, e.g., during the payload mode.

Steps 1012 and 1014 may be optional and may be executed in embodiments in which LUT 560 is used during the payload mode.

At step 1012, controller 550 uses the PE-configuration parameters of step 1010 to generate a fixed constellation. For example, controller 550 may apply a set of different bit-words to ANN 530 using digital signals $522_1$-$522_m$ and then use digital signals $532_1$-$532_2$ to determine the I and Q values corresponding to each such bit-word (also see FIG. 5). The (I,Q) pairs determined in this manner provide the coordinates of the different constellation points of the constellation defined by the fixed PE-configuration parameters. For each of such constellation points, the corresponding input bit-word applied to ANN 530 via digital signals $522_1$-$522_m$ provides the respective binary label.

FIG. 12 graphically shows an example constellation 1200 that can be defined at step 1012 according to an embodiment. More specifically, constellation 1200 corresponds to m=4 and an optical link 140 that is well described by model 1100. Also shown in FIG. 12 are the constellation labels for each of the sixteen constellation points of constellation 1200.

It can be noted that the relative arrangement of constellation points in constellation 1200 may be irregular in the sense that the constellation points are not located on an regular square or rectangular grid, as is the case, e.g., for a conventional 16-QAM constellation. Two groups of constellation points can be noticed. A first group (labeled 1210) has ten constellation points, each having a relatively small amplitude. A second group (labeled 1220) has six constellation points, each having a relatively large amplitude, with the points being in an approximately linear formation. The binary labels in each group are quasi-Gray in nature.

These geometric properties of constellation 1200 can be qualitatively understood, for example, as follows. For relatively small signal amplitudes, signal distortions in channel 1100 are dominated by the Gaussian noise. In this case, an optimal performance can be achieved by appropriately spreading the constellation around the origin, e.g., as in group 1210. For relatively large signal amplitudes, signal distortions in channel 1100 are dominated by the nonlinear phase noise. In this case, an optimal performance can be achieved by appropriately limiting the possible phase values, e.g., as in group 1220.

A person of ordinary skill in the art will understand that an optical channel that is different from channel 1100 may cause system 100 to converge, during training, on a constellation having a different set of geometric characteristics than constellation 1200.

At step 1014 of method 1000, the results of step 1012 may be loaded into LUT 560.

Steps 1016 and 1018 may be optional and may be executed in embodiments in which demapping circuit 770 (FIG. 7) is used during the payload mode.

At step 1016, controller 760 uses the PE-configuration parameters of step 1010 to generate a set of decision maps corresponding to the constellation of step 1012. For example, controller 760 may generate a set of (I,Q) pairs corresponding to the nodes of a relatively tight square or rectangular grid covering the I-Q plane. In this case, the distance between the adjacent grid lines typically determines the resolution of the resulting decision maps.

For example, controller 760 may apply the different (I,Q) pairs corresponding to the nodes of the grid to ANN $800_1$ using digital signals $712_1$-$712_2$ and then use digital signals $722_1$-$722_m$ to determine the bit-words corresponding to each such (I,Q) pair (also see FIG. 8). In this manner, the bit value for each of the m bit positions can be determined for each (I,Q) pair. Appropriate extrapolation and/or interpolation techniques may optionally be used to obtain the bit values for the points that are located between the nodes of the used grid. The resulting body of data can then be converted into decision maps in a relatively straightforward manner.

FIGS. 13A-13D graphically show an example set of decision maps 1310-1340 that can be generated at step 1016 according to an embodiment. More specifically, decision maps 1310-1340 correspond to constellation 1200 (FIG. 12) and channel 1100 (FIG. 11). As already indicated above, the binary labels in constellation 1200 have four bits (i.e., m=4). Decision map 1310 (FIG. 13A) corresponds to the most-significant bit of the labels. Decision map 1320 (FIG. 13B) corresponds to the next most-significant bit of the labels. Decision map 1330 (FIG. 13C) corresponds to the third bit of the labels. Decision map 1340 (FIG. 13D) corresponds to the least-significant bit of the labels.

At step 1018 of method 1000, the decision maps generated at step 1016 may be loaded into demapping circuit 770.

According to an example embodiment disclosed above, e.g., in the summary section and/or in reference to any one or any combination of some or all of FIGS. 1-13, provided is an apparatus comprising: an optical data transmitter (e.g., 110, FIG. 1) that includes: an optical modulator (e.g., 124, FIG. 1), one or more electrical drivers (e.g., 118, FIG. 1) connected to operate the optical modulator to modulate an optical carrier to carry a stream of digital symbols (e.g., I and Q values, FIG. 5), and a digital signal processor (e.g., 112, FIG. 1) connected to control the one or more electrical drivers in response to input data; and wherein the digital signal processor configured to use an artificial neural network (e.g., 530, FIG. 5) to determine values of the digital symbols corresponding to values of input bit-words applied to a plurality of inputs (e.g., $522_1$-$522_m$, FIG. 5) of the artificial neural network, each of the inputs being configured to carry a respective bit of the input bit-words to a different respective portion (e.g., one of $630_1$-$630_m$, FIG. 6) of the artificial neural network, each of the portions being configured to respond to a respective one of the inputs.

In some embodiments of the above apparatus, different ones of the respective portions are separate.

In some embodiments of any of the above apparatus, the artificial neural network further comprises a plurality of processing elements (e.g., the first layer of 650, FIG. 6), wherein each of said processing elements is connected to receive digital inputs from each of the respective portions (e.g., as indicated in FIG. 6).

In some embodiments of any of the above apparatus, the apparatus further comprises an electronic controller (e.g., 550, FIG. 5) configured to change configuration parameters of the artificial neural network based on a training mode in which the optical data transmitter transmits pilot data sequences through an optical fiber (e.g., 140, FIG. 1).

In some embodiments of any of the above apparatus, the electronic controller is further configured to fix the configuration parameters of the artificial neural network for a payload mode in which the transmitter transmits a modulated optical carrier carrying the input data to the optical fiber.

In some embodiments of any of the above apparatus, the apparatus further comprises a look-up table (e.g., 560, FIG. 5) having stored therein values of the digital symbols (e.g., I and Q values, FIG. 5) for different values of the input bit-words; and wherein the electronic controller is further configured to load (e.g., at 1014, FIG. 10) the values of the digital symbols for the different values of the input bit-words into the look-up table based on the training mode.

In some embodiments of any of the above apparatus, the apparatus further comprises a look-up table (e.g., 560, FIG. 5) connected to the plurality of inputs and configured to output the values of the digital symbols in response to the values of the input bit-words.

In some embodiments of any of the above apparatus, the apparatus further comprises a switch (e.g., 540, FIG. 5) configured to select the values of the digital symbols generated by the artificial neural network or the values of the digital symbols generated by the look-up table.

In some embodiments of any of the above apparatus, the apparatus further comprises a forward-error-correction encoder (e.g., 510, FIG. 5) configured to generate a stream of input bit-words for the plurality of electrical inputs by applying a forward-error-correction code to an input data stream (e.g., 502, FIG. 5).

In some embodiments of any of the above apparatus, the apparatus further comprises an optical data receiver (e.g., 190, FIG. 1) that includes an optical-to-electrical converter (e.g., 160, FIG. 1), a plurality of analog-to-digital converters (e.g., 166, FIG. 1), and a second digital signal processor (e.g., 170, FIG. 1), the analog-to-digital converters being configured to output a stream of digitalizations of measurements of the modulated optical carrier, the measurements being performed by the optical-to-electrical converter; and wherein the second digital signal processor is electrically connected to process the stream of digitalizations using a second artificial neural network (e.g., 800, FIG. 8).

In some embodiments of any of the above apparatus, the digital signal processor is configured to determine the values of the digital symbols using a d-dimensional constellation, where d is an integer greater than two.

In some embodiments of any of the above apparatus, the digital signal processor is electrically connected to control the one or more associated electrical drivers and comprises an artificial neural network (e.g., 530, FIG. 5) configured to: receive an input bit-word on a plurality of electrical inputs (e.g., 522$_1$-522$_m$, FIG. 5), each of the electrical inputs being configured to carry a different respective bit of the input bit-word to a different respective portion (e.g., one of 630$_1$-630$_m$, FIG. 6) of the artificial neural network, each of the different respective portions being configured to respond to a respective single one of the electrical inputs; and generate an output digital symbol (e.g., I and Q values, FIG. 5) for the digital-symbol stream in response to the input bit-word.

In some embodiments of any of the above apparatus, the artificial neural network comprises a plurality of interconnected processing elements (e.g., 200, 300, 620, FIG. 6); and wherein any two of the different respective portions have no processing elements in common.

In some embodiments of any of the above apparatus, the electronic controller is further configured to load constellation data (e.g., at 1014, FIG. 10) into the look-up table; and wherein the look-up table is configured to use the constellation data to replicate the output digital symbol generated by the artificial neural network in response to the input bit-word.

In some embodiments of any of the above apparatus, the apparatus further comprises an optical data receiver (e.g., 190, FIG. 1) that includes an optical-to-electrical converter (e.g., 160, FIG. 1), a plurality of analog-to-digital converters (e.g., 166, FIG. 1), and a second digital signal processor (e.g., 170, FIG. 1), the analog-to-digital converters being configured to output a stream of digitalizations of measurements of the modulated optical carrier, the measurements being performed by the optical-to-electrical converter; and wherein the second digital signal processor is electrically connected to process the stream of digitalizations and comprises a second artificial neural network (e.g., 800, FIG. 8) configured to: convert the stream of digitalizations into a stream of output bit-words; and generate an output bit-word of the stream of output bit-words on a plurality of electrical outputs (e.g., 722$_1$-722$_m$, FIG. 8), each of the electrical outputs being configured to carry a different respective bit of the output bit-word generated by a different respective portion (e.g., one of 400$_1$-400$_m$, FIG. 6) of the second artificial neural network, each of the different respective portions of the second artificial neural network being connected to control a respective single one of the electrical outputs.

According to another example embodiment disclosed above, e.g., in the summary section and/or in reference to any one or any combination of some or all of FIGS. 1-13, provided an apparatus comprising: a coherent optical data receiver (e.g., 190, FIG. 1) that includes an optical-to-electrical converter (e.g., 160, FIG. 1) for a modulated optical carrier, a plurality of analog-to-digital converters (e.g., 166, FIG. 1), and a digital signal processor (e.g., 170, FIG. 1), the analog-to-digital converters being configured to output a stream of digitalizations of measurements of the modulated optical carrier performed by the optical-to-electrical converter; and wherein the digital signal processor is electrically connected to process the stream of digitalizations using an artificial neural network (e.g., 800, FIG. 8) configured to generate a stream of output bit-words on a plurality of outputs (e.g., 722$_1$-722$_m$, FIG. 8) in response to the stream of digitalizations, each of the outputs being configured to carry a respective bit of the output bit-words generated by a different respective portion (e.g., one of 400$_1$-400$_m$, FIG. 8) of the artificial neural network, each of the different respective portions being connected to control a respective one of the outputs.

In some embodiments of the above apparatus, different ones of the respective portions are separate.

In some embodiments of any of the above apparatus, the artificial neural network further comprises a plurality of processing elements (e.g., the last layer of 810, FIG. 8); and wherein each of said processing elements is connected to apply digital inputs to each of the different respective portions (e.g., as indicated in FIG. 8).

In some embodiments of any of the above apparatus, the apparatus further comprises an electronic controller (e.g., 760, FIG. 6) configured to change configuration parameters of the artificial neural network based on a training mode in which the coherent optical data receiver receives pilot data sequences through an optical fiber (e.g., 140, FIG. 1).

In some embodiments of any of the above apparatus, the apparatus further comprises a demapping circuit (e.g., 770, FIG. 7) configured to use a plurality of decision maps (e.g., at 1018, FIG. 10) to generate a stream of output bit-words in response to the stream of digitalizations; and wherein the electronic controller is further configured to load the plurality of decision maps into the demapping circuit based on the training mode.

In some embodiments of any of the above apparatus, the apparatus further comprises a demapping circuit (e.g., 770, FIG. 7) configured to generate a stream of output bit-words in response to the stream of digitalizations.

In some embodiments of any of the above apparatus, the apparatus further comprises a switch (e.g., 730, FIG. 7) configured to select the stream of output bit-word generated by the artificial neural network or the stream of output bit-words generated by the demapping circuit.

In some embodiments of any of the above apparatus, the apparatus further comprises comprising a forward-error-correction decoder (e.g., 750, FIG. 7) configured to generate an output data stream (e.g., 502, FIG. 7) by applying a forward-error-correction code to the stream of output bit-words.

In some embodiments of any of the above apparatus, the digital signal processor is configured to generate the stream of output bit-words using a d-dimensional constellation, where d is an integer greater than two.

In some embodiments of any of the above apparatus, the digital signal processor is electrically connected to process the stream of digitalizations and comprises an artificial neural network (e.g., 800, FIG. 8) configured to: convert the stream of digitalizations into a stream of output bit-words; and generate an output bit-word of the stream of output bit-words on a plurality of electrical outputs (e.g., $722_1$-$722_m$, FIG. 8), each of the electrical outputs being configured to carry a different respective bit of the output bit-word generated by a different respective portion (e.g., one of $400_1$-$400_m$, FIG. 6) of the artificial neural network, each of the different respective portions being connected to control a respective single one of the electrical outputs.

In some embodiments of any of the above apparatus, the artificial neural network comprises a plurality of interconnected processing elements (e.g., 200, 300, 410, FIG. 8); and wherein any two of the different respective portions have no processing elements in common.

In some embodiments of any of the above apparatus, the apparatus further comprises a demapping circuit (e.g., 770, FIG. 7) configured to generate an output bit-word for the stream of output bit-words in response to the stream of digitalizations; wherein the electronic controller is further configured to load a plurality of decision maps (e.g., at 1018, FIG. 10) into the demapping circuit; and wherein the demapping circuit is configured to use the decision maps to replicate the output bit-word generated by the artificial neural network in response to the stream of digitalizations.

While this disclosure includes references to illustrative embodiments, this specification is not intended to be construed in a limiting sense.

For example, some embodiments may be adapted to the use of non-coherent transmitters and receivers.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
an optical data transmitter that includes:
an optical modulator,
one or more electrical drivers connected to operate the optical modulator to modulate an optical carrier to carry a stream of digital symbols, and
a digital signal processor connected to control the one or more electrical drivers in response to input data; and
wherein the digital signal processor is configured to use an artificial neural network to determine values of the digital symbols corresponding to values of input bit-words applied to a plurality of inputs of the artificial neural network, each of the inputs being configured to carry a respective bit of the input bit-words to a different respective portion of the artificial neural network, each of the portions including a respective plurality of first processing elements and being configured to respond to a respective single one of the inputs.

2. The apparatus of claim 1, wherein different ones of the respective portions are separate.

3. The apparatus of claim 1,
wherein the artificial neural network further comprises a plurality of second processing elements; and
wherein each of said second processing elements is connected to receive digital inputs from each of the respective portions.

4. The apparatus of claim 1, further comprising an electronic controller configured to change configuration parameters of the artificial neural network based on a training mode in which the optical data transmitter transmits pilot data sequences through an optical fiber.

5. The apparatus of claim 4, wherein the electronic controller is further configured to fix the configuration parameters of the artificial neural network for a payload mode in which the transmitter transmits a modulated optical carrier carrying the input data to the optical fiber.

6. The apparatus of claim 5, further comprising a look-up table having stored therein values of the digital symbols for different values of the input bit-words; and
wherein the electronic controller is further configured to load the values of the digital symbols for the different values of the input bit-words into the look-up table based on the training mode.

7. The apparatus of claim 1, further comprising a look-up table connected to the plurality of inputs and configured to output the values of the digital symbols in response to the values of the input bit-words.

8. The apparatus of claim 7, further comprising a switch configured to select the values of the digital symbols generated by the artificial neural network or the values of the digital symbols generated by the look-up table.

9. The apparatus of claim 1, further comprising a forward-error-correction encoder configured to generate a stream of input bit-words for the plurality of inputs by applying a forward-error-correction code to an input data stream.

10. The apparatus of claim 1, further comprising:
an optical data receiver that includes an optical-to-electrical converter, a plurality of analog-to-digital converters, and a second digital signal processor, the analog-to-digital converters being configured to output a stream of digital values representing measurements of the modulated optical carrier, the measurements being performed by the optical-to-electrical converter; and
wherein the second digital signal processor is electrically connected to process the stream of digital values using a second artificial neural network.

11. The apparatus of claim 1, wherein the digital signal processor is configured to determine the values of the digital symbols using a d-dimensional constellation, where d is an integer greater than two.

12. An apparatus comprising:
a coherent optical data receiver that includes an optical-to-electrical converter for a modulated optical carrier, a plurality of analog-to-digital converters, and a digital signal processor, the analog-to-digital converters being configured to output a stream of digital values representing measurements of the modulated optical carrier performed by the optical-to-electrical converter; and
wherein the digital signal processor is electrically connected to process the stream of digital values using an artificial neural network configured to generate a stream of output bit-words on a plurality of outputs in response to the stream of digital values, each of the outputs being configured to carry a respective bit of the output bit-words generated by a different respective portion of the artificial neural network, each of the different respective portions including a respective plurality of first processing elements and being connected to control a respective single one of the outputs.

13. The apparatus of claim 12, wherein different ones of the respective portions are separate.

14. The apparatus of claim 12,
wherein the artificial neural network further comprises a plurality of second processing elements; and
wherein each of said second processing elements is connected to apply digital inputs to each of the different respective portions.

15. The apparatus of claim 12, further comprising an electronic controller configured to change configuration parameters of the artificial neural network based on a training mode in which the coherent optical data receiver receives pilot data sequences through an optical fiber.

16. The apparatus of claim 15, further comprising a demapping circuit configured to use a plurality of decision maps to generate a stream of output bit-words in response to the stream of digital values; and
wherein the electronic controller is further configured to load the plurality of decision maps into the demapping circuit based on the training mode.

17. The apparatus of claim 12, further comprising a demapping circuit configured to generate a stream of output bit-words in response to the stream of digital values.

18. The apparatus of claim 17, further comprising a switch configured to select the stream of output bit-words generated by the artificial neural network or the stream of output bit-words generated by the demapping circuit.

19. The apparatus of claim 12, further comprising a forward-error-correction decoder configured to generate an output data stream by applying a forward-error-correction code to the stream of output bit-words.

20. The apparatus of claim 12, wherein the digital signal processor is configured to generate the stream of output bit-words using a d-dimensional constellation, where d is an integer greater than two.

21. An apparatus comprising:
an optical data transmitter that includes:
an optical modulator,
one or more electrical drivers connected to operate the optical modulator to modulate an optical carrier to carry a stream of digital symbols, and
a digital signal processor connected to control the one or more electrical drivers in response to input data;
wherein the digital signal processor is configured to use an artificial neural network to determine values of the digital symbols corresponding to values of input bit-words applied to a plurality of inputs of the artificial neural network, each of the inputs being configured to carry a respective bit of the input bit-words to a different respective portion of the artificial neural network, each of the portions being configured to respond to a respective one of the inputs; and
wherein the apparatus further comprises a look-up table connected to the plurality of inputs and configured to output the values of the digital symbols in response to the values of the input bit-words.

22. The apparatus of claim 21, further comprising a switch configured to select the values of the digital symbols generated by the artificial neural network or the values of the digital symbols generated by the look-up table.

23. An apparatus comprising:
a coherent optical data receiver that includes an optical-to-electrical converter for a modulated optical carrier, a plurality of analog-to-digital converters, and a digital signal processor, the analog-to-digital converters being configured to output a stream of digital values representing measurements of the modulated optical carrier performed by the optical-to-electrical converter;
wherein the digital signal processor is electrically connected to process the stream of digital values using an artificial neural network configured to generate a stream of output bit-words on a plurality of outputs in response to the stream of digital values, each of the outputs being configured to carry a respective bit of the output bit-words generated by a different respective portion of the artificial neural network, each of the different respective portions being connected to control a respective one of the outputs; and
wherein the apparatus further comprises a demapping circuit configured to use a plurality of decision maps to generate a stream of output bit-words in response to the stream of digital values.

24. The apparatus of claim 23, further comprising a switch configured to select the stream of output bit-words generated by the artificial neural network or the stream of output bit-words generated by the demapping circuit.

* * * * *